United States Patent
Hasegawa et al.

(10) Patent No.: US 10,601,064 B2
(45) Date of Patent: Mar. 24, 2020

(54) FLUID DISTRIBUTION DEVICE FOR DISTRIBUTING AT LEAST TWO FLUIDS OF A FUEL CELL

(71) Applicant: Nissan Motor Co., Ltd., Yokohama-shi, Kanagawa (JP)

(72) Inventors: Takuya Hasegawa, Kanagawa (JP); Ryuji Fujieda, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 165 days.

(21) Appl. No.: 15/650,217

(22) Filed: Jul. 14, 2017

(65) Prior Publication Data

US 2017/0317372 A1 Nov. 2, 2017

Related U.S. Application Data

(62) Division of application No. 14/766,585, filed as application No. PCT/JP2014/056051 on Mar. 7, 2014, now Pat. No. 9,742,023.

(30) Foreign Application Priority Data

Mar. 8, 2013 (JP) ................................ 2013-046984

(51) Int. Cl.
*H01M 8/10* (2016.01)
*H01M 8/2485* (2016.01)
(Continued)

(52) U.S. Cl.
CPC ........... *H01M 8/2485* (2013.01); *B60L 50/72* (2019.02); *H01M 8/2465* (2013.01);
(Continued)

(58) Field of Classification Search
CPC ............. H01M 8/2485; H01M 8/2483; H01M 8/2484; H01M 8/1007; H01M 8/2465;
(Continued)

(56) References Cited

U.S. PATENT DOCUMENTS

2005/0170235 A1* 8/2005 Hu et al. ............. H01M 8/0247
429/434
2008/0233447 A1 9/2008 Gemba et al.
(Continued)

FOREIGN PATENT DOCUMENTS

| JP | 2000-67884 A | 3/2000 |
|---|---|---|
| JP | 2005-190946 A | 7/2005 |

(Continued)

*Primary Examiner* — Raymond Alejandro
(74) *Attorney, Agent, or Firm* — Global IP Counselors, LLP

(57) ABSTRACT

A fluid distribution device distributes at least two fluids of a fuel cell. The fluid distribution device comprises a block body, first and second external manifolds and first and second communicating portions. The block body includes a side surface that receives the fuel cell. The first external manifold is disposed adjacent the side surface. The second external manifold is disposed away from the side surface. The first and second external manifolds partially overlap, as viewed from the side surface. The second external manifold includes an extension portion that does not overlap with the first external manifold as viewed from the side surface. The first communicating portion has a first hole only communicating a first fluid to the first external manifold from the side surface. The second communicating portion has a second hole portion only communicating a second fluid to the extension portion from the side surface.

13 Claims, 16 Drawing Sheets

(51) Int. Cl.
    *H01M 8/2483* (2016.01)
    *H01M 8/2484* (2016.01)
    *H01M 8/2465* (2016.01)
    *B60L 50/72* (2019.01)

(52) U.S. Cl.
    CPC ....... *H01M 8/2483* (2016.02); *H01M 8/2484* (2016.02); *H01M 2250/20* (2013.01); *Y02T 90/16* (2013.01); *Y02T 90/32* (2013.01); *Y02T 90/34* (2013.01)

(58) Field of Classification Search
    CPC . H01M 2250/20; B60L 11/18; B60L 11/1898; Y02T 90/16; Y02T 90/32; Y02T 90/34
    See application file for complete search history.

(56) References Cited

U.S. PATENT DOCUMENTS

| | | | |
|---|---|---|---|
| 2009/0169930 A1 | 7/2009 | Oh et al. | |
| 2012/0040259 A1 | 2/2012 | Tomura et al. | |
| 2012/0219875 A1* | 8/2012 | Hasegawa | H01M 8/026 429/480 |

FOREIGN PATENT DOCUMENTS

| | | |
|---|---|---|
| JP | 2007-287659 A | 11/2007 |
| WO | 2011/059087 A1 | 5/2011 |

\* cited by examiner

FLUID DISTRIBUTION DEVICE FOR DISTRIBUTING AT LEAST TWO FLUIDS OF A FUEL CELL

CROSS-REFERENCE TO RELATED APPLICATIONS

This application is a divisional application of Ser. No. 14/766,585, filed on Aug. 7, 2015, now issued as U.S. Pat. No. 9,742,023, which is a U.S. National stage application of International Application No. PCT/JP2014/056051, filed Mar. 7, 2014, which claims priority to Japanese Application No. 2013-046984 filed in Japan on Mar. 8, 2013, the contents of each of which is hereby incorporated herein by reference.

BACKGROUND

Field of the Invention

The present invention relates to a fluid distribution device for a fuel cell, and a vehicle with a fuel cell and a fluid distribution device. More specifically, the present invention relates to a fluid distribution device for a compact, high-output fuel cell.

Background Information

A fuel cell is a type of power generating device for extracting electricity by electrochemically oxidizing fuels such as hydrogen and methanol, which has been drawing attention as a clean energy source in recent years. Fuel cells are classified into phosphoric acid types, molten carbonate types, solid oxide types, polymer electrolyte types, etc., according to the type of electrolyte used.

Of these, a polymer electrolyte fuel cell (PEFC) comprises a membrane electrode assembly (MEA) in which electrodes are disposed on both surfaces of an electrolyte membrane. Power is then generated by supplying hydrogen (fuel gas) on one surface and oxygen (oxidation gas) on the other surface of the membrane electrode assembly. Since a volumetric output density equivalent to an internal combustion engine can be obtained with such a PEFC, research is being advanced on the practical applications thereof as a power source for electric vehicles, etc. (see for example Japanese Laid-Open Patent Application No. 2005-190946 and Japanese Laid-Open Patent Application No. 2007-287659).

Various types of packaging methods for the membrane electrode assembly have been proposed, such as the stacked type, the pleated type, and the hollow fiber type. Of these, stacked fuel cells, which are configured by stacking sheet-shaped membrane electrode assemblies with sheet-shaped separators in between, are being widely used.

The output of a fuel cell is proportional to the membrane area and is not proportional to the fuel cell volume. Accordingly, reducing the cell pitch is effective at achieving miniaturization and high output in a stacked fuel cell. However, if only the cell pitch is reduced, pressure loss becomes excessive when fluids such as air, hydrogen, and cooling water pass through the inner surface of the cells. The result of excessive pressure loss is contrary to the demand for a reduction in auxiliary power and, thus, is not preferable.

Accordingly, the present inventors have proposed a fuel cell comprising a low-aspect structure in which the length in the width direction perpendicular to the flow channel direction is longer than the length in the flow channel direction of an approximately rectangular fuels cell (refer to WO 2011/059087). Fluid that is supplied to a fuel cell is supplied via various fluid machinery, such as a compressor, an ejector, a floor, and a pump, as well as via additional piping. For example, in a fuel cell used for automobiles, each fluid is supplied via pipes having a diameter of about 50 mm. Accordingly, when the length in the width direction is significantly wider, when compared to the sizes (diameters) of such pipes, evenly supplying the fluid across the entire width direction becomes difficult. Therefore, a fuel cell having a low-aspect structure requires a fluid distribution mechanism for expanding the size of fluid flow from the size (diameter) of the pipes to the size of the low-aspect structure fuel cell in the width direction. However, a conventional fluid distribution mechanism configured by combining a plurality of pipes is large and bulky. As a result, there is the problem that miniaturization of the fuel cell as a whole is inhibited.

SUMMARY

Therefore, one object of the present invention is to provide a fluid distribution device that is suitable for use in such a fuel cell having a low-aspect structure that is long in the width direction of an electrode layer, in which the respective types of necessary fluid for the fuel cell are supplied or discharged evenly in the width direction and the laminate layer direction.

Upon carrying out intensive research in order to achieve the objective described above, the present inventors found that the problem can be solved by providing a fluid distribution mechanism comprising an internal manifold disposed inside of a cell laminate body that has a specific structure and an external manifold disposed outside of the cell laminate body, producing the present invention.

The fluid distribution device according to the present invention, which achieves the object described above, is used in the fuel cell described above for distributing at least two fluids among the anode, cathode, and cooling fluids; the fluid-supplying external manifolds and the fluid-discharging external manifolds are formed with respect to each of the first and second fluids and comprise a block body that configures an end plate.

Here, if the surface on the side of the block body to which the cell laminate body is disposed were to be one surface, the external manifold for the first fluid that flows on the side closer to the one surface and the external manifold for the second fluid that flows on the side farther from the one surface are disposed partially overlapping, when viewed from the one surface side of the block body. Additionally, the external manifold for the second fluid includes an extension portion that does not overlap with the external manifold for the first fluid, when viewed from the one surface side of the block body. Then, a communicating portion for the first fluid is formed by forming a first hole portion that communicates only with the external manifold for the first fluid from the one surface side, and a communicating portion for the second fluid is formed by forming a second hole portion that communicates only with the external manifold for the second fluid in the extension portion from the one surface side.

BRIEF DESCRIPTION OF THE DRAWINGS

Referring now to the attached drawings which form a part of this original disclosure.

FIGS. 3A to 3C illustrates a unit cell that configures the cell laminate body in which FIG. 3A is a plan view of the separator, FIG. 3B is a plan view of the membrane electrode assembly when a sealing material is attached, and FIG. 3C is a view of the separators disposed on both sides of the membrane electrode assembly.

DETAILED DESCRIPTION OF THE EMBODIMENTS

Figure 1:
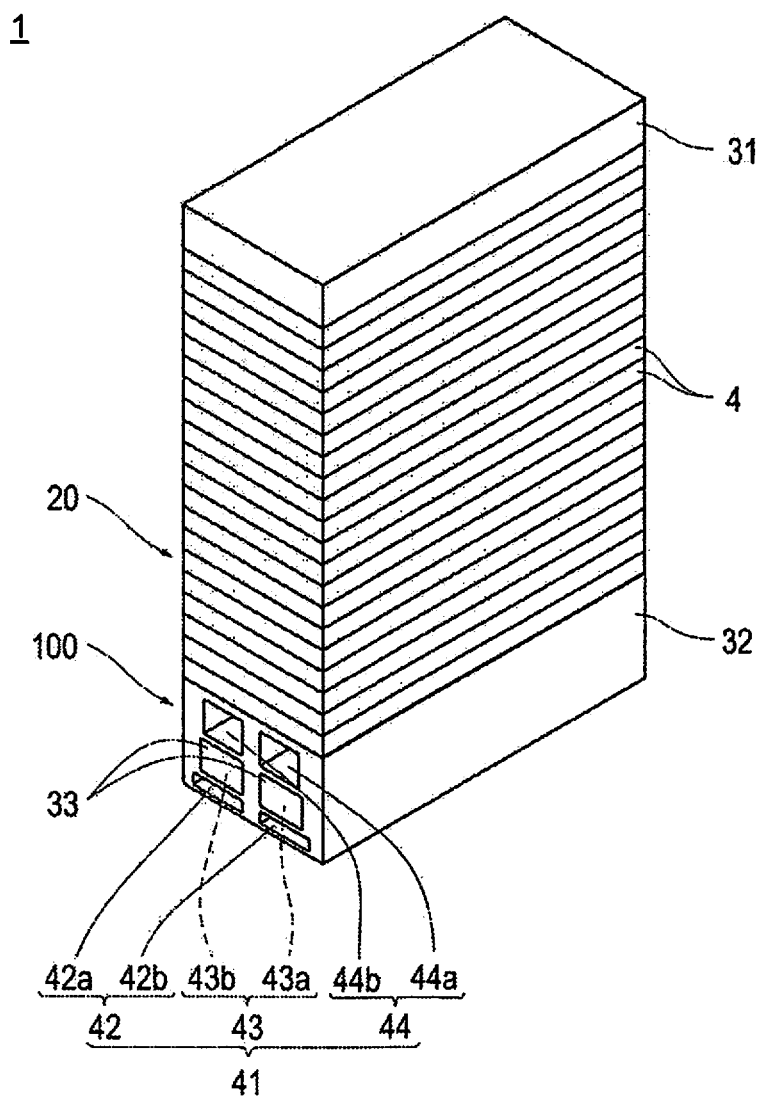
FIG. 1 is a perspective view illustrating the fuel cell according to a first embodiment.

Preferred embodiments of the present invention will be explained below, with reference to the drawings; however, the technical scope of the present invention shall be determined based on the recitation of the claims and is not limited to the following embodiments. In the explanations of the drawings, the same elements have been given the same reference codes, and the overlapping explanations have been omitted. The dimensional ratios in the drawings have been exaggerated for the convenience of explanation, and they are different from the actual ratios.

First Embodiment

The fuel cell 1 of the first embodiment is a stacked fuel cell, comprising a cell laminate body 20, in which a plurality of unit cells 4 are laminated, which is one unit of a fuel cell in which a set of sheet-like separators 2 and sheet-like membrane electrode assemblies 3 are laminated, as illustrated in FIG. 1 to FIG. 3C. The number of laminations of the unit cell 4 is not particularly limited; both those with a single unit cell 4 and those laminating a plurality of unit cells 4 are included in the fuel cell according to the present invention. Collector plates (not shown) are positioned at both ends of the cell laminate body 20 in the laminate layer direction of the unit cells. The collector plate comprises an output terminal to remove the electromotive force that is generated in the cell laminate body 20. Both ends of the cell laminate body 20 are sandwiched by a pair of end plates 31, 32, which are disposed on the outer side of the collector plate. A fuel cell stack is thereby configured. A fluid distribution device 100 is connected to, preferably, the outer lower part of the cell laminate body 20.

External manifolds 42, 43, 44 for supplying or discharging the necessary various fluids to the fuel cell 1 with respect to the cell laminate body 20 are disposed on the fluid distribution device 100, as illustrated in FIG. 1 and FIG. 8 to FIG. 11C. In the first embodiment, the external manifolds 42, 43, 44 for all of the fluids are inside of one end plate 32, from among the end plates 31, 32. The external manifolds 42, 43, 44 may be collectively referred to as the "external manifolds 41." The fuel cell 1 of the first embodiment will be described in detail below.

Membrane Electrode Assembly

Figure 4:
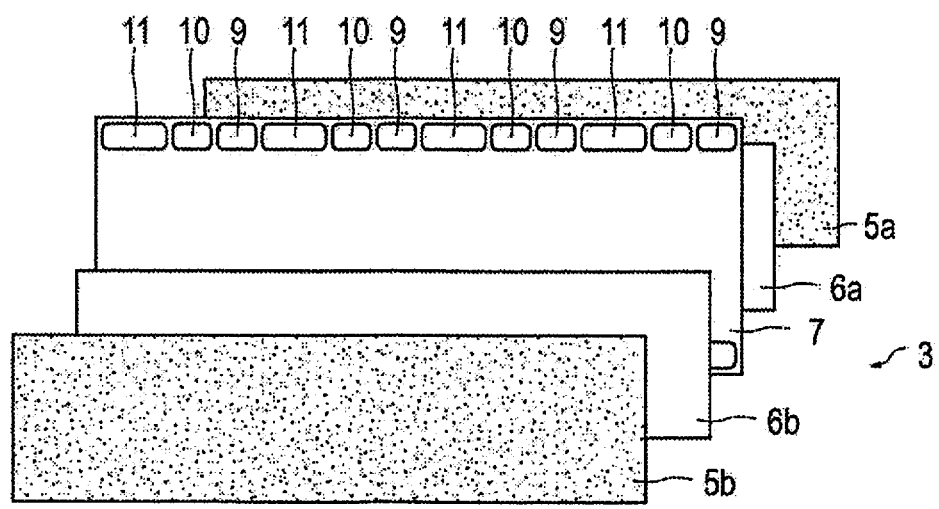
FIG. 4 is an exploded view of the membrane electrode assembly.

The membrane electrode assembly 3 is a joined body comprising the following five layers, in order from the back to the front: gas diffusion layer 5a—catalyst layer 6a—electrode layer 7—catalyst layer 6b—gas diffusion layer 5b, as illustrated in FIG. 4. The membrane electrode assembly 3 generally has a substantially rectangular shape in plain view. The membrane electrode assembly 3 forms a fuel cell by being combined with a similarly substantially rectangular separator 2 to supply or discharge oxygen (oxidation gas) and hydrogen (fuel gas).

In the membrane electrode assembly 3, the surface comprising a catalyst layer 6a on the hydrogen side is referred to as the anode, and the surface comprising a catalyst layer 6b on the oxygen side is referred to as the cathode. The membrane electrode assembly 3 may be referred to as the MEA (membrane electrode assembly), and the gas diffusion layer 5 may be referred to as the GDL (gas diffusion layer).

Also, the three layers of the catalyst layer 6a—the electrode layer 7—the catalyst layer 6b may be referred to as the CCM (catalyst coated membrane), and the two layers of the catalyst layer 6 (6a, 6b may be collectively referred to as 6)—the gas diffusion layer 5 (5a, 5b may be collectively referred to as 5) may be referred to as the gas diffusion electrode or the GDE (gas diffusion electrode). Additionally, the layer comprising the catalyst layer 6 and the gas diffusion layer 5 may be referred to as the electrode layer, and the gas diffusion electrode may simply be referred to as an electrode.

The membrane electrode assembly 3 and the separator 2 do not need to be perfect rectangles; they may be substantially rectangular as long as a flow channel length L and a flow channel width W described below can be identified. That is, the corners of the rectangle may be chamfered or elliptical in shape.

Gas Diffusion Layer

The gas diffusion layers 5a, 5b supply the fuel gas and the oxidation gas supplied to the fuel cell to the catalyst layers 6a, 6b and send and receive electrons between the catalyst layers 6a, 6b and the separator 2. The gas diffusion layers 5a, 5b may further comprise other members (layers) on the surface, inside, or both thereof, within a range that does not inhibit the object of the present invention. For example, carbon particle layers comprising carbon particles may be disposed on the catalyst layers 6a, 6b side of the gas diffusion layers 5a, 5b.

The gas diffusion layers 5a, 5b are preferably porous bodies configured from a conductive material and, more preferably, are a fiber material, including paper, nonwoven fabric, woven fabric, knitted fabric or a net. Examples of conductive materials include carbon materials and metallic materials.

When the gas diffusion layer 5 is configured from fiber material, the half-value r of the average distance between fibers at the surface is preferably equal to or less than 100 μm, is, more preferably, equal to or less than 50 μm, is even more preferably equal to or less than 20 μm, and is further preferably equal to or less than 15 μm; especially preferable is that the distance is equal to or less than 10 μm and, most preferably, is equal to or less than 5 μm. The half-value r of the average distance between the fibers defined here is half of the distance of the average distance between fibers. That is, when the gas diffusion layer comprises a plain weave fiber material made of vertical and horizontal lines, the half-value refers to half of the distance between two adjacent vertical lines or horizontal lines.

The gas diffusion layers 5a, 5b and the catalyst layers 6a, 6b described above are separate layers in FIG. 4. However, the gas diffusion layers and the catalyst layers may be integrated into a single layer.

Aspect Ratio

As described above, the fuel cell 1 comprises a cell laminate body 20 formed by laminating a substantially rectangular separator 2 and a membrane electrode assembly 3 equipped with substantially rectangular anode and cathode electrode layers (catalyst layer 6 and gas diffusion layer 5) located on opposite surfaces of a substantially rectangular electrolyte membrane 7.

An anode flow channel, a cathode flow channel, and a cooling fluid channel are inside of the cell laminate body 20. Of these three flow channels, at least the anode flow channel and the cathode flow channel are configured from a plurality of linear ribs. Each flow channel is formed between two opposing sides and comprises a structure in which fuel gas (anode gas), oxidation gas (cathode gas), cooling fluid, etc. are introduced from one side and are discharged from the other side.

In the fuel cell of the present embodiment, the aspect ratio R (L/W), which is the ratio of the length (L) of the electrode layer along the flow channel direction and the width (W) of the electrode layer in the width direction that is perpendicular to the flow channel direction, is less than 1.

Figure 5A:
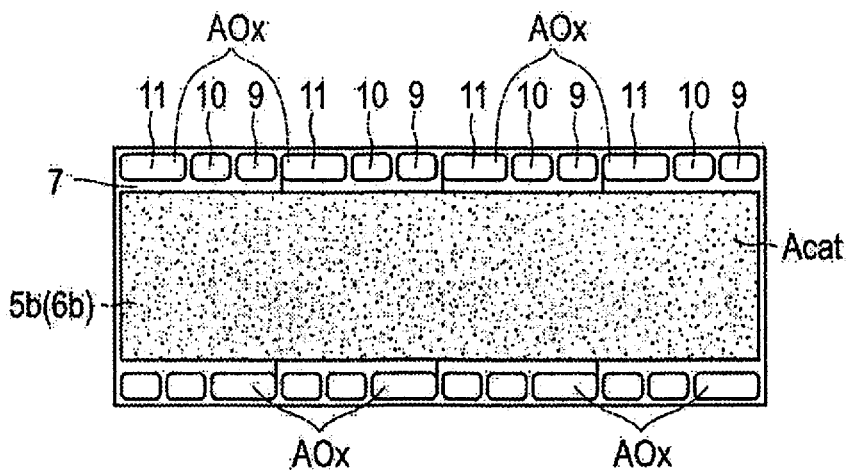
FIG. 5A is a plan view illustrating the membrane electrode assembly.
Figure 5B:
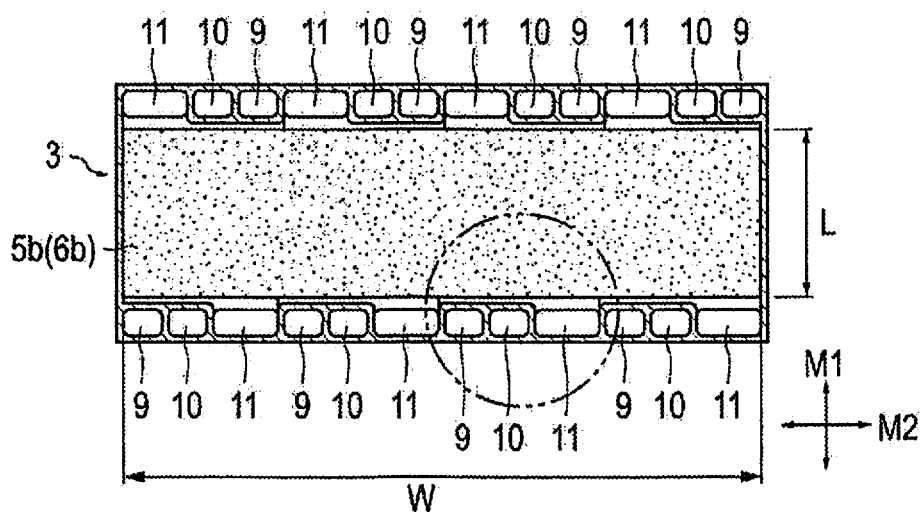
FIG. 5B is a plan view illustrating the membrane electrode assembly when a sealing material is attached.

Specifically, in an electrode layer of the substantially rectangular membrane electrode assembly 3, when the direction in which the oxidation gas flows (the direction indicated by arrow M1) is considered to be the short side and the direction that is perpendicular to the direction in which the oxidation gas flows (the direction indicated by arrow M2) is considered to be the long side, the aspect ratio R is defined by R=short side/long side=L/W, as illustrated in FIG. 5B. The aspect ratio R of the membrane electrode assembly 3 is, strictly speaking, the ratio (L/W) of the length (L) with respect to the width (W) of the catalyst layers 6a, 6b disposed on an active area in which power generation occurs. Since, in this embodiment, the membrane electrode assembly 3 is a concept including the catalyst layers 6a, 6b, for convenience, the expression, aspect ratio R of the membrane electrode assembly 3, is used herein below.

In the description above, the direction in which the oxidation gas flows was considered to be the short side, the direction that is perpendicular to the direction in which the oxidation gas flows was considered to be the long side, and the aspect ratio R of the membrane electrode assembly 3 was defined as R=short side/long side=L/W. However, the direction in which the fuel gas flows on the anode side or the direction in which the cooling fluid flows in the cooling layer may be considered to be the short side, and the direction that is perpendicular to the direction in which the fuel gas flows or the direction that is perpendicular to the direction in which the cooling fluid flows in the cooling layer may be considered to be the long side when defining the aspect ratio R of the membrane electrode assembly 3.

The aspect ratio R of the membrane electrode assembly 3 is 0.01 or more and less than 1. The lower limit of the aspect ratio is preferably 0.05 or more, more preferably 0.1 or more, and even more preferably 0.2 or more. On the other hand, the upper limit of the aspect ratio is preferably less than 0.9, more preferably less than 0.8, even more preferably less than 0.7, and most preferably less than 0.6. When the aspect ratio R is less than 0.01, the outer shape of the fuel cell becomes too elongated, and there is the possibility that a problem occurs when considering mounting the fuel cell to a vehicle.

Figure 3A:
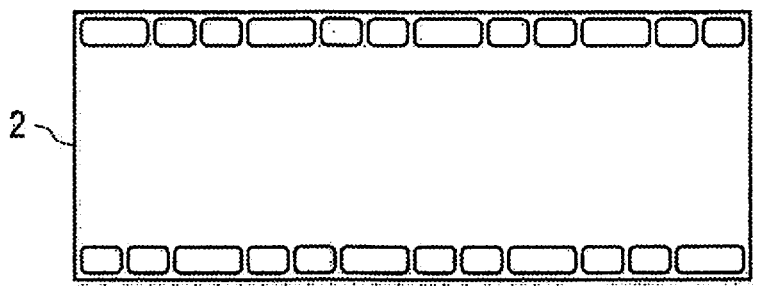
Figure 3B:
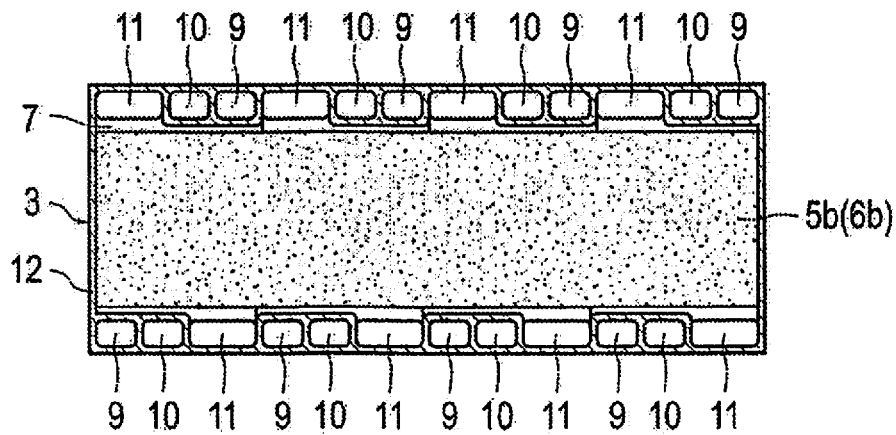
Figure 3C:
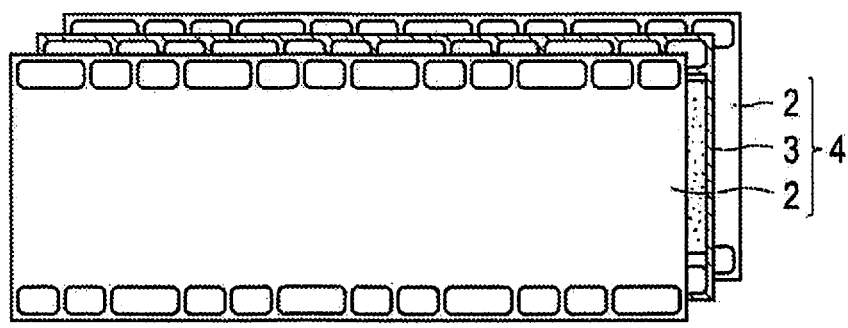
Figure 7A:
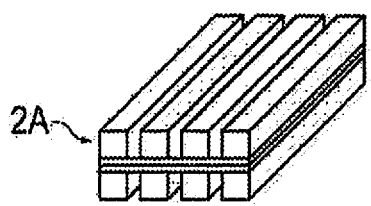
FIG. 7A is a view illustrating a separator with a high aspect ratio.
Figure 7B:
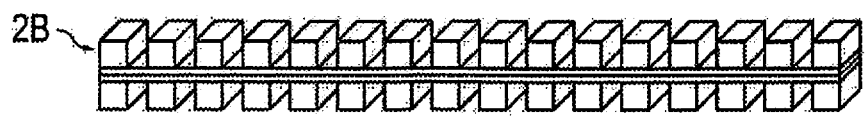
FIG. 7B is a view illustrating a separator with a low aspect ratio.
Figure 7C:
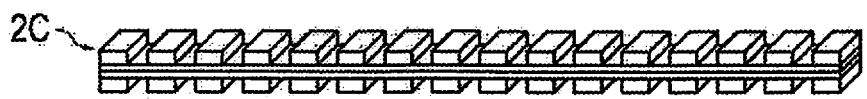
FIG. 7C is a view illustrating a separator with a low aspect ratio and a low flow channel height.

In more detail, in the embodiment of a rectangular shape of the membrane electrode assembly 3 in which the aspect ratio R is 0.01 or more and less than 1, the shape of the separator 2 is also configured in a rectangular shape to match the membrane electrode assembly 3, as illustrated in FIG. 3. Then, for example, when a separator 2A has a high aspect ratio (R is equal to or greater than 1), the flow channel length also becomes long, and the pressure loss increases, as illustrated in FIG. 7A. In contrast, when a separator 2B has a low aspect ratio (R is 0.01 or more and less than 1), the flow channel length becomes short, and pressure loss decreases, as compared to the separator 2A, as illustrated in FIG. 7B. That is, even when the area is the same and the flow amount to the flow channel is the same as the separator 2A, pressure loss can be decreased by decreasing the aspect ratio R, as in the case with the separator 2B. Consequently, even if the aspect ratio R is set to be small and the height of the flow channel is lowered, as in FIG. 7C, a pressure loss similar to that in the separator 2A can be maintained, and the height of the separator 2 can be lowered.

In addition, since the cross-sectional area of the flow channel will be smaller for the flow channel of the separator 2C than for the flow channel of the separator 2B, the flow rate of the reaction gas will be faster in the flow channel of the separator 2C than in the flow channel for the separator 2B. As a result, the generated water present in the flow channel can be blown away by the reaction gas, and flooding can be suppressed. In particular, while a configuration like the separator 2C is preferably applied to the cathode side where generated water tends to be retained, application to the anode side or application to the cooling fluid can also contribute to the miniaturization of the fuel cell.

In the fuel cell of the present embodiment, the direction in which the fuel gas flows is preferably parallel to the direction in which the oxidation gas flows. However, the direction in which the fuel gas flows can also be perpendicular to the direction in which the oxidation gas flows (cross flow). When parallel, the direction in which the fuel gas flows and the direction in which the oxidation gas flows may be either the same direction (co-flow) or opposite directions (counter flow); of these, a counter flow is preferred.

Additionally, in the present embodiment, the direction in which the cooling fluid flows is preferably parallel to the direction in which the oxidation gas flows; however, this may also be perpendicular (cross flow). When parallel, the direction in which the cooling fluid flows and the direction in which the oxidation gas flows may be either the same direction (co-flow) or opposite directions (counter flow); of these, a co-flow is preferred.

Flow Channel Opening

In the present embodiment, two or more flow channel openings are disposed in each of the two ends of the respective flow channels (the anode flow channel, the cathode flow channel, and the cooling fluid channel). By having two or more flow channel openings, even in the fuel cell of the present embodiment which is long in the width direction, supplying gas and cooling fluid evenly in the width direction is easy.

A plurality of fuel gas flow channel openings 9, cooling water flow channel openings 10, and oxidation gas flow channel openings 11 are disposed in the outer peripheral part of the two opposing sides (long sides) of the membrane electrode assembly 3, as illustrated in FIG. 5B. The cooling water flow channel opening 10 is sandwiched between the fuel gas flow channel opening 9 and the oxidation gas flow channel opening 11. If necessary, the cooling water flow channel opening 10 may be disposed on the short side of the outer peripheral part of the membrane electrode assembly 3. Code "8" in FIG. 5C represents a widened portion, and code "12" represents a sealing material.

A plurality of fuel gas flow channel openings 9, cooling water flow channel openings 10, and oxidation gas flow channel openings 11 are also disposed in the outer peripheral part of the two opposing sides (long sides) of the electrolyte membrane 7, as illustrated in FIG. 4 and FIG. 5A. However, flow channel openings are not necessarily disposed in the electrolyte membrane 7. For example, a carrier sheet made of resin, to which includes flow channel openings, is disposed along the outer edge of an electrolyte membrane having the same planar shape as the catalyst layer. Then, the outer edge of the electrolyte membrane and the inner edge of the carrier sheet are hermetically sealed. The same function as the membrane electrode assembly 3 in FIG. 4 can thereby be expressed.

Figure 5C:
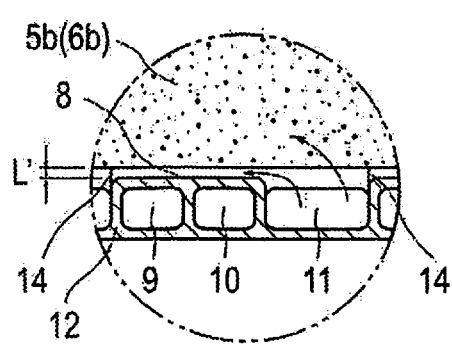
FIG. 5C is an enlarged plan view illustrating the principle parts of a widened portion formed between the flow channel opening and the catalyst layer for the internal manifold.

Additionally, sealing material 12 is disposed at the respective outer peripheral edges of the cathode side surface and the anode side surface of the membrane electrode assembly 3, as illustrated in FIG. 5B and FIG. 5C. Specifically, the sealing material 12 is disposed at the outer peripheral edge of the cathode side surface of the electrolyte membrane 7, so as to surround the entire outer periphery, as well as to surround the fuel gas flow channel openings 9 and the cooling water flow channel openings 10. However, the sealing material 12 is not disposed around the oxidation gas flow channel openings 11. On the other hand, while a diagram has been omitted, sealing material 12 is disposed at the outer peripheral edge of the anode side surface of the electrolyte membrane 7, so as to surround the entire outer periphery, as well as to surround the oxidation gas flow channel openings 11 and the cooling water flow channel openings 10. However, the sealing material 12 is not disposed around the fuel gas flow channel openings 9.

The sealing material 12 comprises a switching function to select which fluid (fuel gas, oxidation gas, or cooling fluid) to distribute to the membrane electrode assembly 3. For example, in FIG. 5B, the sealing material 12 is opened in front of the oxidation gas flow channel opening 11, so that the cathode side of the membrane electrode assembly 3 can be shown.

The sum AOx of the cross-sectional area of the oxidation gas flow channel openings 11 is preferably equal to or greater than 5% and equal to or less than 20% of the catalyst area Acat of the cathode catalyst layer 6b, as illustrated in FIG. 5A. If AOx is less than 5%, there is the possibility that the oxidation gas distribution in the width direction M2 and the laminate layer direction of the membrane electrode assembly 3 is reduced and that the ventilation pressure loss in the oxidation gas flow channel openings 11 is increased. Conversely, if AOx exceeds 20%, the volume of the fuel cell becomes large and, thus, is not preferable.

The sum ARe of the cross-sectional area of the fuel gas flow channel openings 9 is preferably equal to or greater than 5% and equal to or less than 20% of the catalyst area Acat of the anode catalyst layer 6a. If ARe is less than 5%, there is the possibility that the fuel gas distribution in the width direction M2 of the membrane electrode assembly 3 is reduced and that the ventilation pressure loss in the fuel gas flow channel openings 9 is increased. Conversely, if ARe exceeds 20%, the volume of the fuel cell becomes large and, thus, is not preferable.

The number of oxidation gas flow channel openings 11 is preferably divided into a plurality with respect to one active area (an area in which the catalyst layers 6a, 6b exist). The lower limit of this number of divisions of the oxidation gas flow channel openings NOx is preferably 2 or more, more preferably 5 or more, even more preferably 10 or more, and even more preferably 15 or more. By configuring the divisions of the NOx to be two or more, the oxidation gas can be more easily and evenly introduced by the membrane electrode assembly 3. The upper limit of NOx is preferably 100 or less, more preferably 50 or less, even more preferably 30 or less, and even more preferably 20 or less. If NOx exceeds 100, there is little issue when the fuel cell is extremely large, but the area of the sealing material required for each oxidation gas flow channel opening 11 becomes large. Consequently, there is the possibility that achieving miniaturization, which is an object of the present application, will be difficult. In FIGS. 5A and 5B, the oxidation gas flow channel openings 11 are divided into four sections in one of the long sides (width W) of the membrane electrode assembly 3.

As with the case of the oxidation gas flow channel openings 11, the lower limit of the number of divisions of the fuel gas flow channel openings NRe is preferably 2 or more, more preferably 5 or more, even more preferably 10 or more, and even more preferably 15 or more. The upper limit of NRe is preferably 100 or less, more preferably 50 or less, even more preferably 30 or less, and even more preferably 20 or less. In FIGS. 5A and 5B, the fuel gas flow channel openings 9 are divided into four sections in one of the long sides (width W) of the membrane electrode assembly 3.

Widened Portion

The widened portion 8 is a flow channel for supplying oxidation gas or fuel gas to a catalyst layer that is disposed in front of the adjacent flow channel openings for different types of fluids. For example, by providing a fixed gap (distance) L' between the catalyst layers 6a, 6b and the flow channel openings 9, 10, 11, the gap can be configured as the widened portion, as illustrated in FIGS. 5B and 5C. More specifically, for example, the widened portion 8 in the oxidation gas corresponds to the site between the catalyst layers 6a, 6b (actually, the gas diffusion layers 5a, 5b disposed above the catalyst layers 6a, 6b) and the sealing material 12 that surrounds the periphery of the fuel gas flow channel openings 9 and the cooling water flow channel openings 10.

By providing such a widened portion 8, oxidation gas that flows out from the oxidation gas flow channel openings 11 is diffused in the width direction M2 of the membrane electrode assembly 3 through the widened portion 8, as illustrated in FIG. 5C. Then, the diffused oxidation gas is evenly supplied to the gas diffusion layer 5b and the catalyst layer 6b. Accordingly, efficiently generating power across the entire MEA active area becomes possible.

The length L' of the widened portion 8 is preferably equal to or greater than 5% and equal to or less than 20% of the flow channel length L of the catalyst layers 6a, 6b (including the gas diffusion layers 5a, 5b) in the gas flow direction M1. If the length L' of the widened portion 8 is equal to or less than 5% of the flow channel length, the loss of pressure for supplying oxidation gas or fuel gas in front of the adjacent different type flow channel openings becomes large and, thus, is not preferable. If exceeding 20% of the flow channel length, miniaturization of the fuel cell becomes difficult and, thus, is not preferable.

In the present embodiment, the widened portion 8 may be divided in accordance with the number of divisions of the flow channel openings 9, 10, 11. For example, in FIG. 5C, the widened portion 8 is divided to be parallel to the flow channel direction M1 of the membrane electrode assembly 3 by a widened portion dividing portion 14, which is configured by protruding a portion of the sealing material 12 toward the gas diffusion layers 5a, 5b. The number of divisions of this widened portion 8 preferably matches the number of divisions of the flow channel openings NOx. Then, in FIG. 5, the number of divisions of the widened portion matches the number of divisions of the oxidation gas flow channel openings and is set to four. With this type of division of the widened portion 8, limiting the supply of fluid from each flow channel opening to a specific flow channel width becomes possible. As a result, even if there is a greater than expected variability in the supply of fluid, the fluid can be evenly supplied with respect to the width direction M2 of the membrane electrode assembly 3.

Separator

The separator 2 in the unit cell 4 comprises a function to collect the electrons that are removed from the anode side catalyst layer 6a to the gas diffusion layer 5a and sending them to an external load circuit; the separator also comprises a function to distribute the electrons that have returned from the external load circuit to the gas diffusion layer 5b and transmitting them to the cathode side catalyst layer 6b. Furthermore, the separator 2 in the unit cell 4 takes on a gas cutoff function by adhering to the gas diffusion layer 5 when the surface on the opposite side of the catalyst layer 6 side of the gas diffusion layer 5 does not have a gas cutoff function. The separator 2 also takes on a temperature adjusting function (a cooling function) of the fuel cell by configuring a cooling layer (a cooling fluid channel) as needed.

The separator 2 is preferably a nonporous body having conductivity between the front and back of the separator 2 and, more preferably, is a metal foil, such as aluminum foil, gold foil, nickel foil, copper foil, and stainless steel foil, or a carbon foil configured from a carbon material, such as natural graphite. When configured from a metal material besides a noble metal, there are cases in which an oxide film is formed on the surface, increasing the electric resistance. To avoid this, a surface layer consisting of one of the noble metals, such as gold, platinum, or palladium, a conductive carbon material, a conductive ceramic, or a conductive plastic is preferably disposed on the surface of the metal material, using a technique known to a person skilled in the art. For example, a noble metal surface layer can be formed using well-known means, such as plating or sputtering. Furthermore, regarding the carbon material surface layer, of the known technology referred to as DLC (Diamond-Like Carbon), especially those rich in SP2, having a structure similar to graphite and high conductivity, are widely used. Providing a base layer of chromium, etc. for the purpose of stabilizing these surface layers is also known.

In FIG. 3, a plurality of flow channel openings are disposed on the outer peripheral part of the two opposing sides of the separator 2, but flow channel openings are not necessarily disposed in the separator. For example, a carrier sheet made of resin having flow channel openings is disposed along the outer edge of a separator having the same planar shape as the catalyst layer 6. Then, the outer edge of the separator and the inner edge of the carrier sheet are hermetically sealed. The same function as the separator in FIG. 3 can thereby be expressed. The function of the flow channel openings of the separator 2 is equivalent to the function of the flow channel openings of the membrane electrode assembly 3.

Flow Channel

Figure 6A:
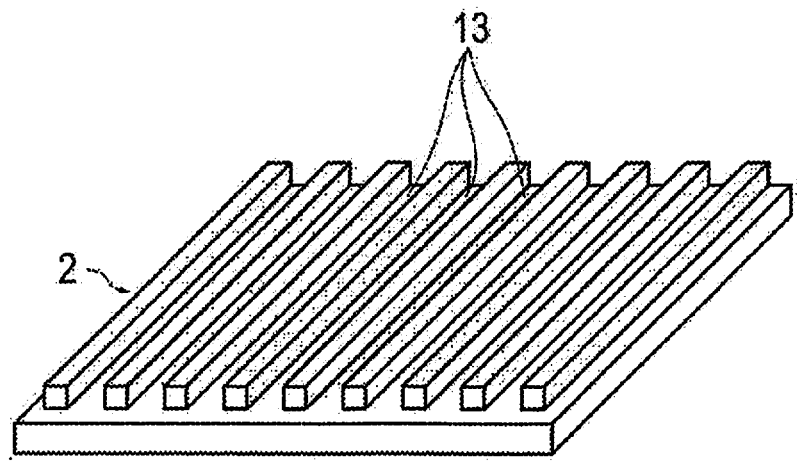
FIG. 6A is a perspective view illustrating a separator to which a gas flow channel is formed.

A flow channel 13 for circulating oxidation gas or fuel gas can be formed on the surface of the separator 2, as illustrated in FIG. 6A. Additionally, a flow channel (not shown) for circulating a coolant therein can be formed in the separator 2, if necessary.

Figure 6B:
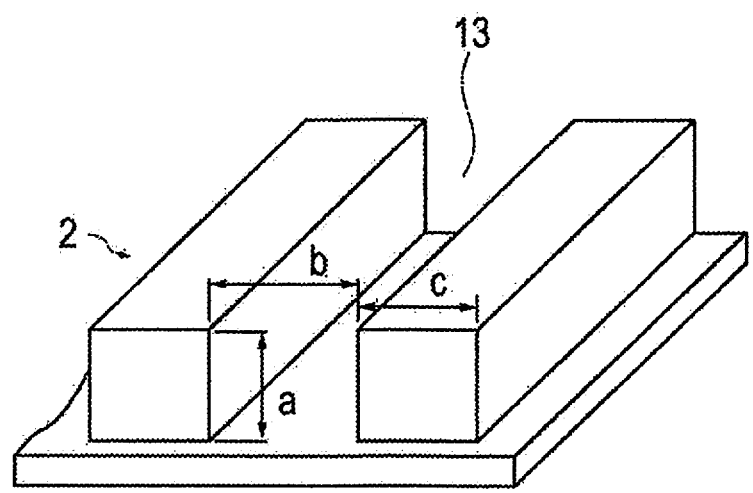
FIG. 6B is an enlarged perspective view illustrating the gas flow channel.

The cross-sectional shape of the flow channel disposed in the separator 2 is formed from convex portions referred to as ribs and concave portions referred to as channels. Of these, electrons generated in the catalyst layer are collected by the ribs coming in contact with the gas diffusion layer. In FIG. 6B, reference codes "a," "b," and "c" indicate the flow channel height of the flow channel 13 (the height of the ribs), the channel width of the flow channel 13, and the rib width of the flow channel 13, respectively.

In the flow channel disposed inside of the cell laminate body 20, the rib width c is defined by the arithmetic average of the width of the rib upper end and the width of the rib lower end. The lower limit of the rib width c is preferably 10μ or greater, is more preferably 50μ or greater, is even more preferably 100μ or greater, and is even more preferably 200μ or greater. The upper limit of the rib width c is preferably 1000μ or less, is more preferably 500μ or less, is even more preferably 400μ or less, and is even more preferably 300μ or less. The object of the present invention can be achieved even if the rib width c is narrower than 10μ, so a significant problem does not occur; however, the processing means may be limited. When the rib width c exceeds 1000μ, there are cases in which oxidation gas or fuel gas cannot be sufficiently supplied to the portion that comes in contact with the ribs via the gas diffusion layer, of the catalyst layer surfaces. The lower limit of the rib height a is preferably 10μ or greater, is more preferably 50μ or greater, is even more preferably 100μ or greater, is even more preferably 125μ or greater, and is most preferably 150μ or greater. The upper limit of the rib height a is preferably 1000μ or less, is more preferably 500μ or less, is even more preferably 300μ or less, is even more preferably 200μ or less, and is most preferably 180μ or less. When the rib height a is less than 10μ, there are cases in which the flow channel area becomes small and the pressure loss increases excessively. When the rib height a is higher than 1000μ, there are cases in which the flow channel cross-sectional area becomes large and the pressure loss decreases excessively. In a fuel cell in which reaction water is generated accompanying driving, an operation is generally performed to constantly discharge with oxidation gas or fuel gas, so that the generated water does not stay in the flow channel, by applying a predetermined pressure loss in the flow channel.

In the flow channel disposed inside of the cell laminate body 20, a channel is a space sandwiched between ribs. The channel width b is defined by the arithmetic average of the width of the channel upper end and the width of the channel lower end. The lower limit of the channel width b is preferably 10μ or greater, is more preferably 50μ or greater, is even more preferably 100μ or greater, and is even more preferably 200μ or greater. The upper limit of the channel width b is preferably 1000μ or less, is more preferably 500μ or less, is even more preferably 400μ or less, and is even more preferably 300μ or less. Even if the gas flow amount and the ratio of the widths of the ribs and channels are the same, if the channel width b is narrower than 10μ, there are cases in which the effects of the surface friction of the ribs becomes great and the pressure loss increases too much. If the channel width b is greater than 1000μ, there are cases in which the flow channel area expands or contracts too much when pressure difference is generated between the two sides of the membrane electrode assembly 3.

The horizontal shape of the flow channel 13 is preferably formed in a linear shape that connects the two opposing sides of the substantially rectangular catalyst layers at the shortest distance. In this case, for example, when oxidation gas is supplied from the oxidation gas flow channel openings 11 on the upper side, the oxidation gas is diffused in the width direction M2 through the upper side widened portion 8 and thereafter flows downward through the flow channel 13, which is parallel to the gas flow direction M1, as illustrated in FIG. 5B. Then, the oxidation gas is discharged from the oxidation gas flow channel openings 11, disposed on the lower side, through the lower side widened portion 8. Accordingly, oxidation gas can be efficiently dispersed in the gas diffusion layer 5b and the cathode catalyst layer 6b.

The flow channel 13 may be configured as a straight or a curved line that is equal to or greater than the shortest distance, within a range that does not inhibit the object of the present invention. In this embodiment, since fuel gas and oxidation gas necessary for the fuel cell reaction are evenly distributed across the entire surface of the catalyst layer via the gas diffusion layer, the entire surface of the catalyst layer can be covered.

Examples of manufacturing methods for the flow channel 13 include well-known means such as press working and cutting.

The flow channel 13 in which the reaction gas circulates may be formed by ribs and channels on the surface of the separator 2, as described above. However, the present invention is not limited to this; the same function as the flow channel 13 has can be imparted to the gas diffusion layers 5a, 5b of the membrane electrode assembly 3. For example, grooves that exert the same function as the flow channel 13 can be formed in the gas diffusion layers 5a, 5b. In this embodiment, since there is no need to form a flow channel 13 comprising the ribs and channels described above on the surface of the separator 2, the separator can be made to be smooth. The flow channel described above may be disposed in both the gas diffusion layers 5a, 5b and the separator 2.

Electrolyte Membrane

The electrolyte membrane 7 is a type of permselective film comprising a function to transport protons and insulate electrons. The electrolyte membrane 7 is broadly divided into fluorine-based electrolyte membranes and hydrocarbon-based electrolyte membranes, depending on the type of the ion exchange resin, which is the constituent material. Of these, fluorine-based electrolyte membranes have excellent heat resistance and chemical stability due to having a C—F bond. For example, a perfluorosulfonic acid membrane known by the product name NATION (registered trademark, manufactured by DuPont) is widely used as the electrolyte membrane 7.

Catalyst Layer

The cathode catalyst layer 6b is a layer comprising an ionomer and an electrode catalyst, in which a catalyst component is held. The electrode catalyst comprises a function to promote a reaction that generates water from protons, electrons, and oxygen (oxygen reduction reaction). The electrode catalyst comprises a structure in which a catalyst component, such as platinum, is held on the surface of a conductive carrier consisting of, for example, carbon.

The anode catalyst layer 6a is a layer comprising an electrode catalyst, in which a catalyst component is held, and an ionomer. The electrode catalyst comprises a function to promote a reaction that dissociates hydrogen into protons and electrons (hydrogen oxidation reaction). The electrode catalyst comprises a structure in which a catalyst component such as platinum is held on the surface of a conductive carrier consisting of, for example, carbon.

Internal Manifold

Figure 2:
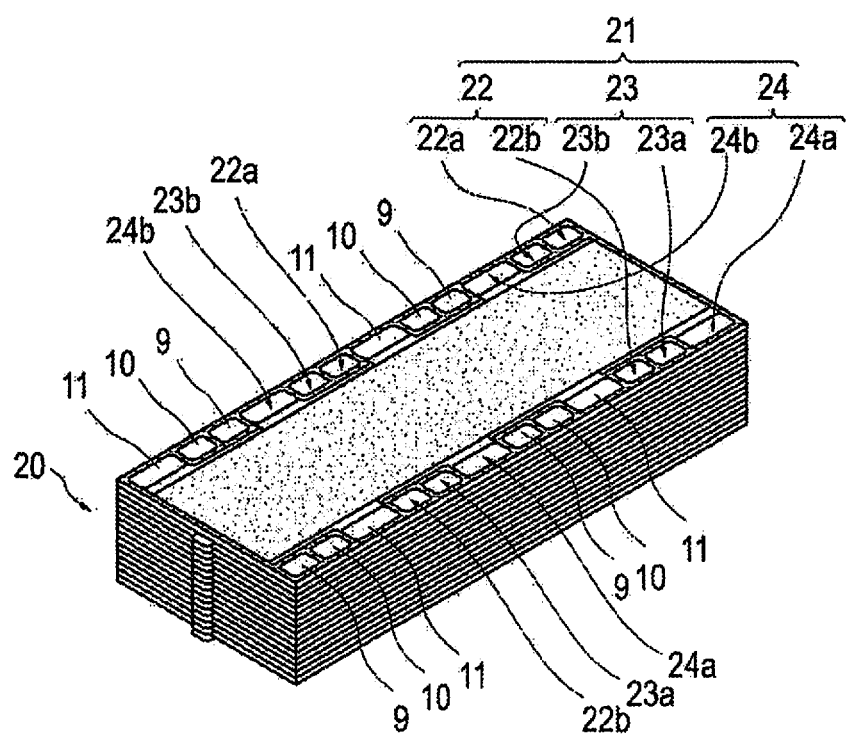
FIG. 2 is a perspective view illustrating the cell laminate body.

The fuel gas flow channel openings 9, the cooling water flow channel openings 10, and the oxidation gas flow channel openings 11 disposed on the long sides of the outer peripheral part of the membrane electrode assembly 3 or the separator 2 are mutually connected to the flow channel openings 9, 10, 11 included in the adjacent unit cell 4, following the lamination of the unit cells 4. Plural internal manifolds 21 (22, 23, 24) with the same length as the cell laminate body 20 are thereby configured for each fluid, as illustrated in FIG. 2. Reference code "22" indicates internal manifolds for fuel gas formed by stacking fuel gas flow channel openings 9; reference code "23" indicates internal manifolds for cooling water formed by stacking cooling water flow channel openings 10; and reference code "24" indicates internal manifolds for oxidation gas formed by stacking oxidation gas flow channel openings 11. Each of the internal manifolds 22, 23, and 24 includes a fluid-supplying internal manifold 21 and a fluid-discharging internal manifold 21.

When describing the internal manifold 21, distinguishing between those for fluid-supplying and for fluid-discharging, the letter "a" is appended to the reference codes of those for fluid-supplying, which are referred to as fluid-supplying internal manifolds 22a, 23a, 24a. Also, the letter "b" is appended to the reference codes of those for fluid-discharging, which are referred to as fluid-discharging internal manifolds 22b, 23b, 24b.

Two or more fuel gas flow channel openings 9 are disposed in each of the two ends of the fuel gas flow channel, and two or more oxidation gas flow channel openings 11 are disposed in each of the two ends of the oxidation gas flow channel. Two or more cooling water flow channel openings 10 are also disposed in each of the two ends of the cooling fluid channel. Accordingly, two or more fluid-supplying internal manifolds 21 and fluid-discharging internal manifolds 21 are formed in the cell laminate body 20 for each fluid.

The number of flow channel openings 9, 10, 11, and internal manifolds 22, 23, 24 may be increased according to the aspect ratio R. That is, three or more fluid-supplying internal manifolds 21 and fluid-discharging internal manifolds 21 may be provided for each fluid. This is because the distribution ability can be improved by increasing the number according to the aspect ratio R.

External Manifold

External manifolds 41 (a collective term for 42, 43, 44) for supplying or discharging each fluid with respect to the cell laminate body 20 are disposed outside of the cell laminate body 20, as illustrated in FIG. 1. The reference code "42" indicates external manifolds for fuel gas, reference code "43" indicates external manifolds for cooling water, and reference code "44" indicates external manifolds for oxidation gas. The external manifolds 42, 43, 44 include fluid-supplying external manifolds 41, which are connected to the fluid-supplying internal manifolds 21 via a supply-side communicating portion 50a, and fluid-discharging external manifolds 41, which connect to the fluid-discharging internal manifolds 21 via a discharge-side communicating portion 50b, for each fluid, as illustrated in FIG. 9-FIG. 11.

When describing the external manifold 41, when distinguishing between those for fluid-supplying and for fluid-discharging, the letter "a" is appended to the reference codes of those for fluid-supplying, which are referred to as the fluid-supplying external manifolds 42a, 43a, 44a. Also, the letter "b" is appended to the reference codes of those for fluid-discharging, which are referred to as the fluid-discharging external manifolds 42b, 43b, 44b.

External manifolds 41 are disposed outside of the cell laminate body 20 for each fluid in order to connect with the internal manifolds 21 to supply or discharge the necessary fluids to the fuel cell. The external manifolds 41 comprise a plurality of supply-side communicating portions 50a and discharge-side communicating portions 50b for connecting with a plurality of internal manifolds 21. The external manifolds 41 further comprise an inlet and an outlet for connecting with a fluid device outside of the fuel cell stack and for supplying or discharging fluids.

Figure 10:
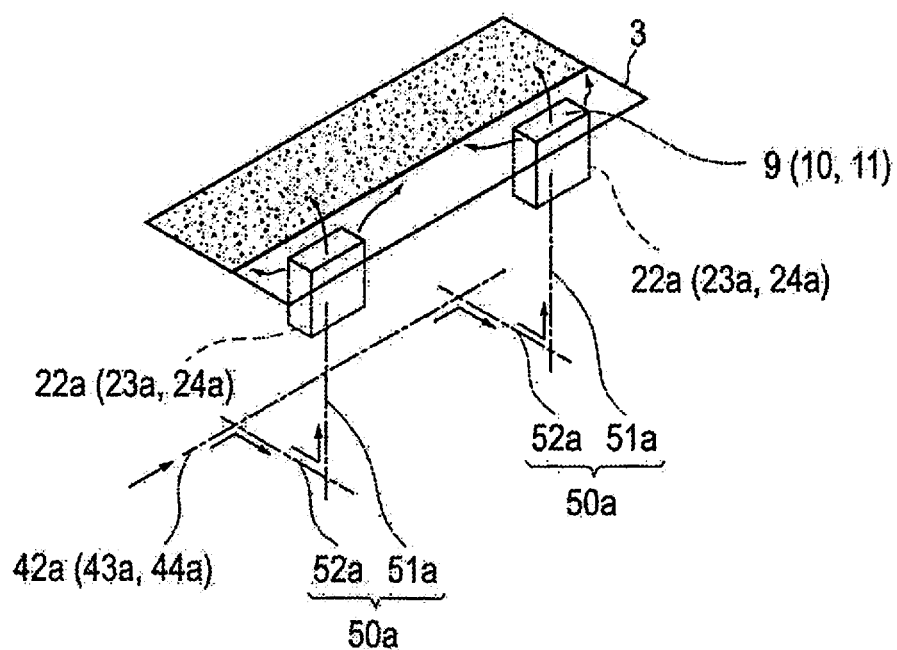
FIG. 10 is an explanatory view showing the first and second auxiliary manifolds disposed on a communicating portion for connecting an external manifold and an internal manifold, using the fluid supply side as an example.

As illustrated schematically in FIG. 10, the respective fluid-supplying external manifold 42a (43a, 44a) and fluid-discharging external manifold 42b (43b, 44b) are positioned approximately in parallel, extending in the width direction of the cell laminate body 20. In the fluid-supplying and fluid-discharging external manifolds 41 (42, 43, 44), the inlet and the outlet are preferably opened on the same surface. In addition to the center lines being perfectly parallel to each other, "parallel" must be interpreted as including cases in which the extension lines from the center lines intersect while inclining from a parallel state, to the extent that an improvement in the distribution ability can be achieved, which is an object of the present invention.

The supply-side communicating portions 50a comprise at least a first auxiliary manifold 51a, which is connected to the fluid-supplying internal manifolds 22a, 23a, 24a, and a second auxiliary manifold 52a, which comprises a center line that intersects with the center lines of the fluid-supplying external manifolds 42a, 43a, 44a, as well as the center line of the first auxiliary manifold 51a, and which is connected to the fluid-supplying external manifolds 42a, 43a, 44a, as illustrated in FIG. 9-FIG. 11. Similarly, the discharge-side communicating portions 50b comprise at least a first auxiliary manifold 51b, which is connected to the fluid-supplying internal manifolds 22b, 23b, 24b, and a second auxiliary manifold 52b, which comprises a center line that intersects with the center lines of the fluid-supplying external manifolds 42b, 43b, 44b, as well as the center line of the first auxiliary manifold 51b, and which is connected to the fluid-supplying external manifolds 42b, 43b, 44b, as illustrated in FIG. 9-FIG. 11. The supply-side communicating portions 50a and the discharge-side communicating portions 50b may be collectively referred to as the "communicating portions 50;" the first auxiliary manifolds 51a, 51b may be collectively referred to as the "first auxiliary manifolds 51;" and the second auxiliary manifolds 52a, 52b may be collectively referred to as the "second auxiliary manifolds 52."

The center line of the second auxiliary manifolds 52 of the communicating portions 50 intersects with the center line of the external manifolds 41 and intersects the center line of the first auxiliary manifolds 51 that are connected to the internal manifolds 21, as illustrated in FIG. 10. In addition to the center lines being orthogonal to each other, "intersect" must be interpreted as including cases in which the center lines intersect while inclining from an orthogonal state, to the extent that an improvement in the distribution ability can be achieved, which is an object of the present invention.

The configuration described above is characterized by each fluid flowing while substantially crossing more than once in the communicating portions 50 between the external manifolds 41 and the internal manifolds 21. Here, "substantially crossing more than once" means that a crossing of the central flux line is directly or indirectly observed substantially twice in the two pipes referred to as the external manifold 41 and the internal manifold 21 when fluid is circulated between pipes of each other via the communicating portion 50. Here, "directly or indirectly observed" means confirming the flow of fluids by experiment or simulation.

However, for example, the following type of connection is not considered as "substantially crossing more than once." That is, a case in which two pipes are put in contact so as to be orthogonal, cutting the contact portion so that the center line of one will be included in the pipe of the other, and providing a through port in the form of deeply meshing with each other. In this connection form, the central flux line is bent substantially twice but is only skewed and cannot achieve an improvement in the distribution ability; thus, this is not considered to be crossing.

In a fuel cell comprising a low-aspect structure and comprising two or more fluid-supplying internal manifolds 21 and fluid-discharging internal manifolds 21 for each fluid, various necessary fluids for the fuel cell can be evenly supplied or discharged in the width direction of the unit cells 4, as well as in the laminate layer direction, while suppressing drift, by providing a distribution mechanism for flowing each fluid between the external manifolds 41 and the internal manifolds 21 while substantially crossing more than once. As a result, efficiently generating power becomes possible, and providing a compact, high-output fuel cell becomes possible.

Figure 8:
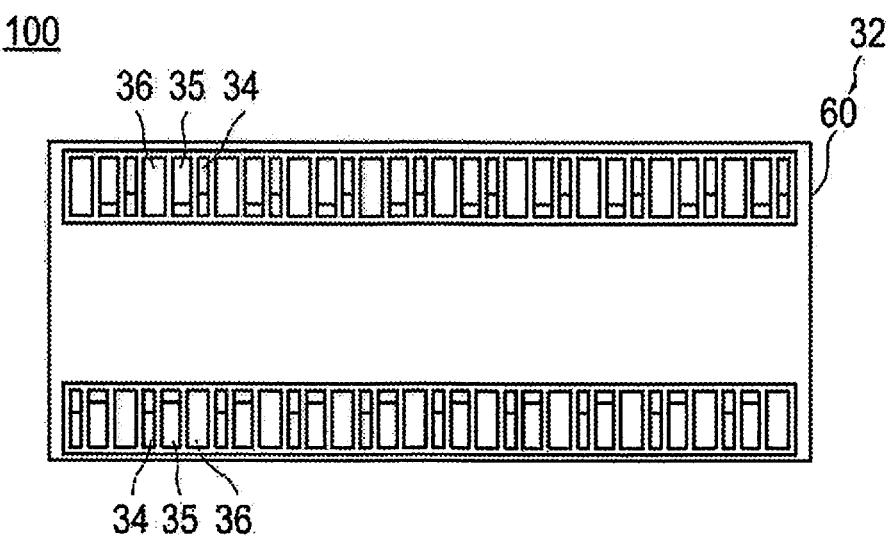
FIG. 8 is a plan view illustrating an end plate incorporating a fluid distribution device.

The external manifolds 41 are preferably disposed so that the center line is offset inward of the center line of the internal manifolds 21 (refer to FIG. 8-FIG. 10). This is because, when compared to disposing the external manifolds 41 outside of the cell laminate body 20 when viewed from the laminating direction of the unit cells 4, the volume occupied by the fuel cell can be reduced, and the degree of freedom in the vehicle layout can be increased.

When the external manifold 44 of the oxidation gas, the external manifold 43 of the cooling water, and the external manifold 42 of the fuel gas are disposed overlapping in the laminate layer direction of the unit cells 4 in the cell laminate body 20, disposing the external manifold 43 of the cooling water between the external manifold 44 of the oxidation gas and the external manifold 42 of the fuel gas is preferable, since temperature control of the oxidation gas and the fuel gas is facilitated. In general, the closer the external manifolds 41 (42, 43, 44) are disposed to the cell laminate body 20, the longer the inlet length for the fluid that flows in the external manifolds 41 to flow in or flow out with respect to the cell laminate body 20, that is, the longer the distance of the communicating portion 50, specifically the distance of the first auxiliary manifold 51, can be; as a result, the flow of the fluid is stabilized, and drifting of the fluid in the internal manifolds 21 (22, 23, 24) can be reduced. When drifting of the fluid in the internal manifolds 21 is reduced, each fluid is evenly distributed to the respective unit cells 4, and the efficiency of the fuel cell 1 is increased, which is preferable. Here, since drift in the internal manifolds 21 is reduced as the speed of the fluid is decreased at the same time as the inlet length, reducing drifting is possible if the cross-sectional area of the first auxiliary manifolds 51 or the internal manifolds 21 is large, even when the inlet length is short. A person skilled in the art can appropriately determine the placement of the external manifolds 42, 43, 44 based on the relationship between the inlet length and the cross-sectional area.

The external manifolds 41 may be provided for the fuel gas, the cooling water, and the oxidation gas. For each fluid, the external manifolds 41 (42, 43, 44) and the first and second auxiliary manifolds 51, 52 in the communicating portions 50 are preferably disposed inside of an end plate 32 (or 31). This is because miniaturization of the fuel cell can be achieved by integrating the external manifolds 41 and the communicating portions 50 into the end plate 32 (or 31).

Minimizing the volume of the fluid distribution device is also possible by configuring all of the external manifolds 41 of the fuel gas, the cooling water, and the oxidation gas, as well as all the first and second auxiliary manifolds 51, 52 in the communicating portions 50, to be inside of one of the end plates 32 (or 31). In this embodiment, the external manifold 44 for the oxidation gas is preferably disposed on the layer closest to the cell laminate body 20; the external manifold 42 for the fuel gas is preferably disposed on the farther layer; and the external manifold 43 for the cooling water is preferably disposed in between. This is because, when configuring an end plate 32 (three-step monocoque end plate 32) comprising three layers of external manifolds 42, 43, 44, the cooling water is circulated between the fuel gas and the oxidation gas; therefore, maintaining the temperature of each fuel cell fluid becomes easy, which is preferable.

The ratio of the cross-sectional area of the discharge-side pipe and the cross-sectional area of the supply-side pipe of the external manifolds 41 may be the same or different, depending on the purpose. However, in a cathode that uses cooling water and air, the discharge-side cross-sectional area of the external manifolds 43, 44 is preferably larger than the cross-sectional area of the supply-side. Of the fluids supplied to the fuel cell, the cooling water is not consumed during power generation. Also, when using air as the oxidation gas, while oxygen is consumed, nitrogen is not consumed, so the amount of decrease is smaller as compared to the fuel gas in the anode. This is because, in a fluid in which the flow amount does not change during the flow or in which the amount of decrease is small, pressure loss on the discharge side can be reduced, and the distribution ability can be improved by configuring the discharge-side cross-sectional area to be larger than the supply-side cross-sectional area.

In a fuel gas that is consumed during the flow, the magnitude relationship of the discharge-side and supply-side cross-sectional areas cannot be categorically set; however, a person skilled in the art would be able to appropriately determine this from the above point of view, based on the actual change in the flow amount on the discharge-side and the supply-side. Also, using oxygen instead of air as the oxidation gas is the same as using fuel gas.

The respective openings of the external manifolds 42, 43, 44 may be opened on the same fuel cell stack side or on the opposite side of the fuel cell stack, with respect to the respective fluids. However, each of the inlets and outlets of the external manifolds 42, 43, 44 is preferably open on the same surface. In the present invention, opening the inlets and outlets on the same surface is referred to as a U-flow, and opening the inlets and outlets on opposite surfaces is referred to as a Z-flow, based on having similar shapes as these letters. In the present invention, the U-flow is preferable; if the Z-flow is used, there are cases in which unevenness in the flow amount occurs easily in the width direction of the cell laminate body in each of the internal manifolds and in each of the flow channels. In the first embodiment, the external manifolds 42, 43, 44 for the fuel gas, the cooling water, and the oxidation gas, as well as a communicating portion 50, are disposed in the same end plate 32. Of the opposing sides of the end plate 32, the inlet and the outlet of the external manifold 42 for the fuel gas are open on the first side (the front left side in the drawing), and the inlet and the outlet of the external manifold 44 for the oxidation gas are open on the same first side, as illustrated in FIG. 1. The inlet and the outlet of the external manifold 43 for the cooling water are open on the second side on the opposite side. The external manifolds 41 are formed from through-holes that penetrate from the first side to the second side of the end plate 32. The openings on the second side of the external manifold 42 for the fuel gas and the external manifold 44 for the oxidation gas are sealed by a closing plate after forming the through-holes. On the other hand, the opening on the first side of the external manifold 43 for the cooling water is sealed by a closing plate 33 after forming the through-hole.

In addition to having a high volumetric output density, the fuel cell 1 of the present embodiment has a high degree of freedom in the arrangement of the exit/entrance for supplying or discharging the necessary fluids to the fuel cell 1; therefore, a good mountability and layout ability can be provided.

End Plate

Figure 9A:
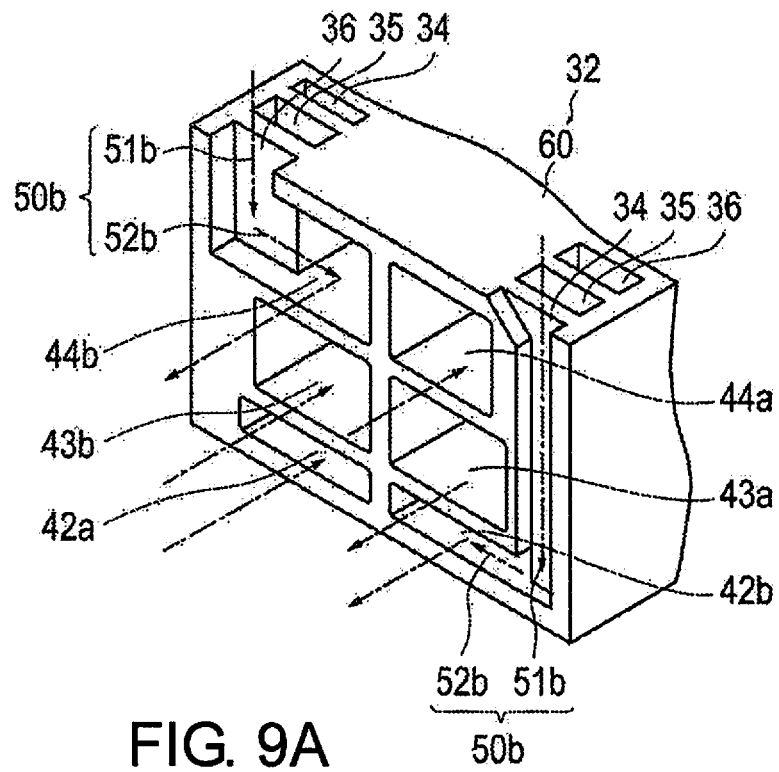
FIG. 9A is a perspective view illustrating a cross section of the principle part of the end plate that incorporates a fluid distribution device.

The cell laminate body 20 obtained by alternately stacking the membrane electrode assembly 3 and the separator 2 is sandwiched by end plates 31, 32 from both sides in the laminate layer direction. A fuel cell stack is thereby configured. Plural connection ports 34, 35, 36 are formed on the contact surface with the cell laminate body 20 in the end plate 32, as illustrated in FIG. 8 and FIG. 9A. Various necessary fluids for the fuel cell 1 are supplied or discharged between the end plate 32 and the internal manifolds 21 via these connection ports 34, 35, 36. The reference code "34" indicates a connection port for fuel gas, reference code "35" indicates a connection port for cooling water, and reference code "36" indicates a connection port for oxidation gas.

Displacement Absorption Mechanism

A displacement absorption mechanism may be disposed in the fuel cell 1 in order to absorb the dimensional changes of the cell laminate body 20 in the laminate layer direction, such as swelling and contraction due to the hydration and drying of the electrolyte membrane, in order to homogenize the pressure distribution in the cell laminate body. Displacement absorption mechanisms known to a person skilled in the art, configured from an elastic body such as a disc spring or rubber, may be used as the displacement absorption mechanism. The displacement absorption mechanism is preferably disposed on at least one of the end plates 31, 32 and inside or on the surface of the end plates 31, 32.

As described above, for each fluid, the external manifolds 42, 43, 44 and the first and second auxiliary manifolds 51, 52 in the communicating portions 50 are preferably disposed inside of the end plate 32 (or 31).

Fluid Distribution Device

Figure 9B:
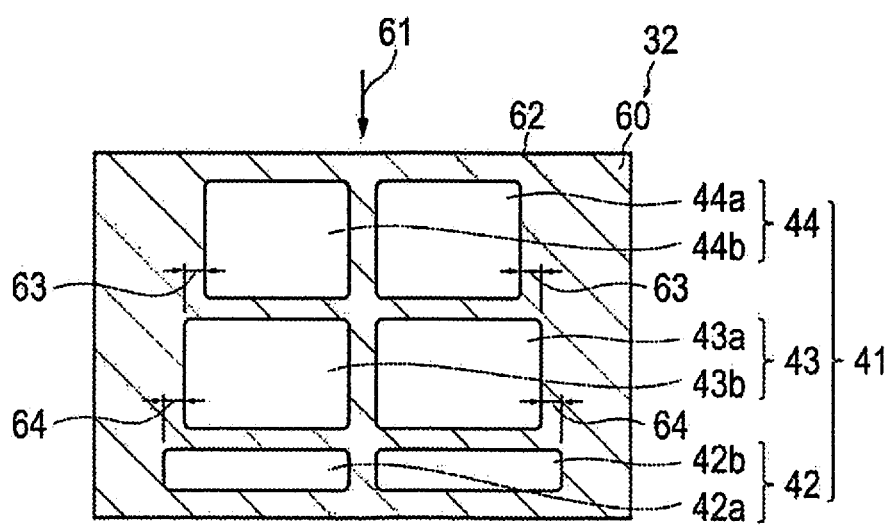
FIG. 9B is a cross-sectional view illustrating an end plate to which is provided an external manifold.

The fluid distribution device 100 of the first embodiment comprises a block body 60, in which are formed external manifolds 41 (42, 43, 44), and the first and second auxiliary manifolds 51 (51a, 51b), 52 (52a, 52b) of the communicating portions 50 (50a, 50b) in each of the fluids, as illustrated in FIGS. 9A and 9B. The block body 60 configures one of the end plates 32.

If the surface on the side of the block body 60 to which the cell laminate body 20 is disposed were to be one surface 62, the external manifold 44 for the first fluid that flows on the side closer to the one surface 62 and the external manifold 42 for the second fluid that flows on the side farther from the one surface 62 are disposed partially overlapping when viewed from the one surface 62 side of the block body, as indicated by the arrow 61. Additionally, when viewed from the one surface 62 side of the block body 60, the external manifold 43 for the third fluid comprises an extension portion 63 that does not overlap with the external manifold 44 for the first fluid, and the external manifold 42 for the second fluid comprises an extension portion 64 that does not overlap with the external manifold 43 for the third fluid. The one surface 62 of the block body 60 is connected to the end surface of the cell laminate body 20. In the case of the first embodiment, the first fluid is oxidation gas, the second fluid is fuel gas, and the third fluid is cooling water, as described above.

The first and second auxiliary manifolds 51, 52 in the communicating portions 50 are formed in the following manner.

Figure 11A:
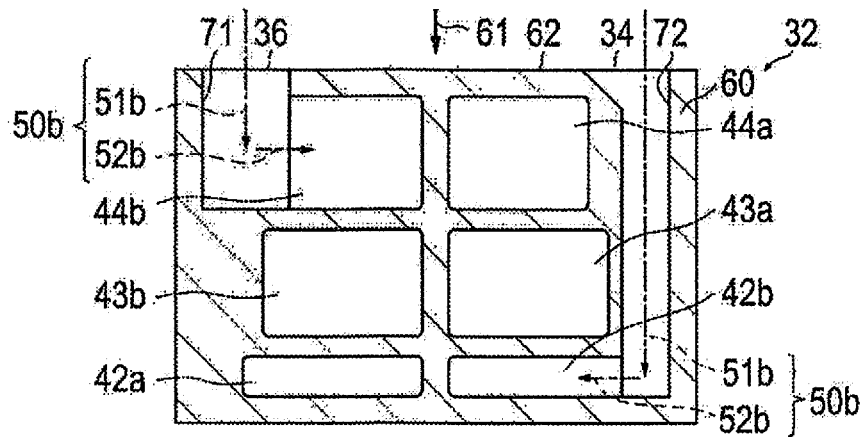
FIGS. 11A to 11C are cross-sectional views illustrating the states in which the first and the second auxiliary manifolds in the supply-side communicating portion, as well as the first and the second auxiliary manifolds in the discharge-side communicating portion, are formed for each fluid in the block body configuring the end plate.
Figure 11B:
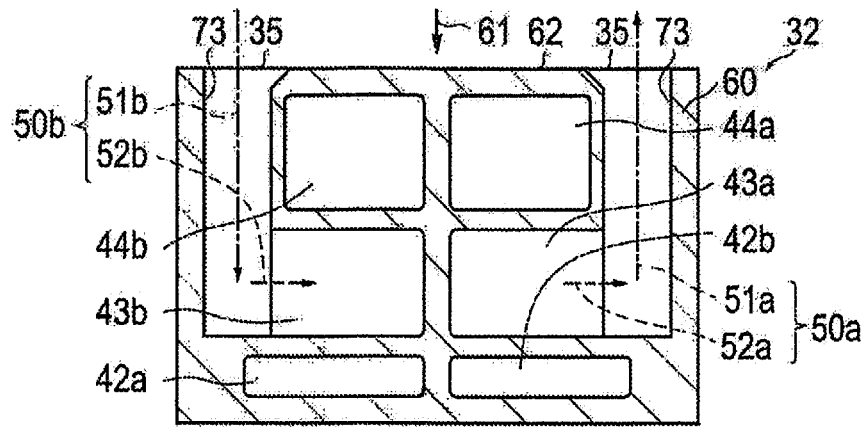
Figure 11C:
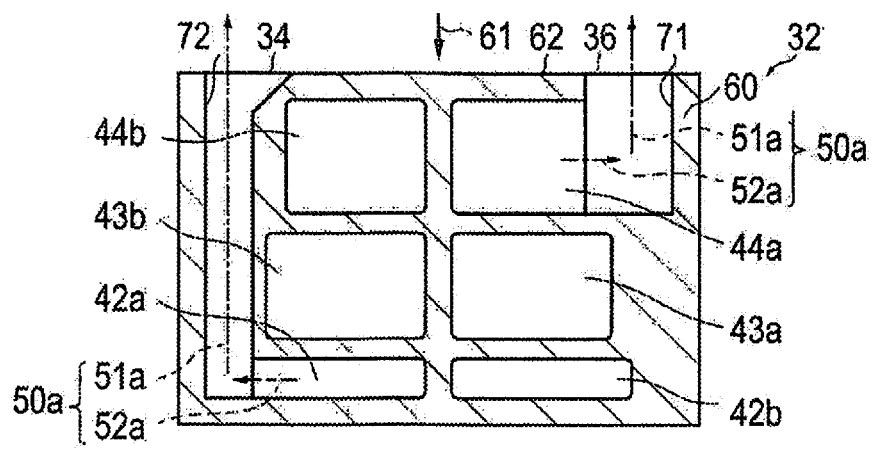

Regarding the supply-side communicating portion 50a for the first fluid (oxidation gas), a first hole portion 71 that communicates only to the external manifold 44a for the first fluid is formed from the one surface 62 side, as illustrated in FIG. 11C. A portion of the side wall that forms a partition in the external manifold 44a for the first fluid is removed by the first hole portion 71, and first and second auxiliary manifolds 51a, 52a for the first fluid are formed.

Regarding the discharge-side communicating portion 50b for the first fluid, a first hole portion 71 that communicates only to the external manifold 44b for the first fluid is formed from the one surface 62 side, as illustrated in FIG. 11A. A portion of the side wall that forms a partition in the external manifold 44b for the first fluid is removed by the first hole portion 71, and first and second auxiliary manifolds 51b, 52b for the first fluid are formed.

Regarding the supply-side communicating portion 50a for the second fluid (fuel gas), a second hole portion 72 that communicates only to the external manifold 42a for the second fluid in the extension portion 64 (refer to FIG. 9B) is formed from the one surface 62 side, as illustrated in FIG. 11C. A portion of the side wall that forms a partition in the external manifold 42a for the second fluid is removed by the second hole portion 72, and first and second auxiliary manifolds 51a, 52a for the second fluid are formed.

Regarding the discharge-side communicating portion 50b for the second fluid, a second hole portion 72 that communicates only to the external manifold 42b for the second fluid is formed from the one surface 62 side, as illustrated in FIG. 11A. A portion of the side wall that forms a partition in the external manifold 42b for the second fluid is removed by the second hole portion 72, and first and second auxiliary manifolds 51b, 52b for the second fluid are formed.

Regarding the supply-side communicating portion 50a for the third fluid (cooling water), a third hole portion 73 that communicates only to the external manifold 43a for the third fluid in the extension portion 63 (refer to FIG. 9B) is formed from the one surface 62 side, as illustrated in FIG. 11B. A portion of the side wall that forms a partition in the external manifold 43a for the third fluid is removed by the third hole portion 73, and first and second auxiliary manifolds 51a, 52a for the third fluid are formed.

Regarding the discharge-side communicating portion 50b for the third fluid, a third hole portion 73 that communicates only to the external manifold 43b for the third fluid in the extension portion 63 is formed from the one surface 62 side, as illustrated in FIG. 11B. A portion of the side wall that forms a partition in the external manifold 43b for the third fluid is removed by the third hole portion 73, and first and second auxiliary manifolds 51b, 52b for the third fluid are formed.

An inclined surface that is inclined from the one surface 62 toward the hole portions 72, 73 is formed in the upper portion of the second hole portion 72 and the third hole portion 73. The size of the connection port 34 for fuel gas and the connection port 35 for cooling water in the left-right direction in FIG. 11 is thereby set to be the same size as the connection port 36 for the oxidation gas.

The fluid distribution device 100 forms the external manifolds 41 and the communicating portions 50 in a block body 60 that configures the end plate 32; as a result, miniaturization of the fuel cell 1 can be achieved. In addition, since the external manifolds 41 and the first and second auxiliary manifolds 51, 52 in the communicating portions 50 can be formed by cutting operations, the manufacturing of the fluid distribution device 100 can be simplified and can be performed inexpensively, as compared to assembling by welding and joining numerous parts.

Mechanism of the Fuel Cell

The mechanism of the fuel cell 1 is as follows. That is, protons and electrons are generated from hydrogen that is supplied to the anode catalyst layer 6a. The protons generated in the anode move inside of the electrolyte membrane 7 and reach the cathode catalyst layer 6b. Meanwhile, the electrons generated in the anode are taken out of the fuel cell along a conductive wire (conductor). Then, after consuming electricity in an external load circuit, the above-described electrons return to the cathode along the conductive wire (conductor) and react with the oxygen supplied to the cathode catalyst layer 6b to generate water.

Operation of the Fuel Cell

The operation of the fuel cell 1 is performed by supplying hydrogen to one electrode (anode) and oxygen or air to the other electrode (cathode). The higher the operating temperature of the fuel cell, the more the catalyst activity increases and, thus, is preferable; however, normally, the operation is often conducted at 50° C.-100° C., at which temperature moisture management is easy.

Vehicle Equipped with a Fuel Cell

Figure 12A:
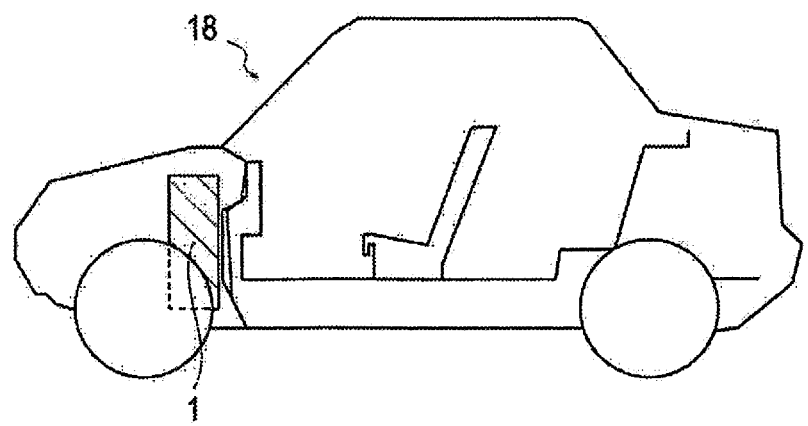
FIGS. 12A and 12B are views illustrating an example of a vehicle equipped with a fuel cell.
Figure 12B:
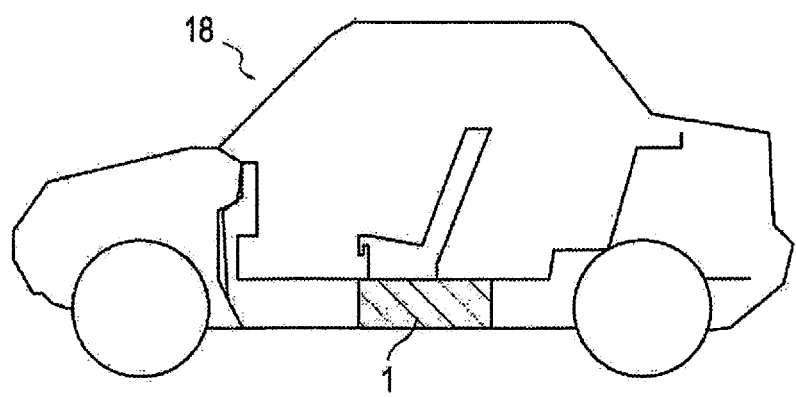

FIGS. 12A and 12B are views illustrating an example of a vehicle equipped with the fuel cell of the present embodiment. The vehicle 18 illustrated in FIG. 12A is equipped with the fuel cell 1 of the present embodiment as a drive source in the engine bay. The vehicle 18 illustrated in FIG. 12B is equipped with the fuel cell 1 of the present embodiment as a drive source below the floor. For example, polymer electrolyte fuel cells (PEFC) and stacked fuel cells to which the present invention is applied have extremely excellent output performances and are, thus, suitable for vehicle applications, which require high output.

Layout of the Cell Laminate Body 20 and the External Manifolds 41

Figure 13A:
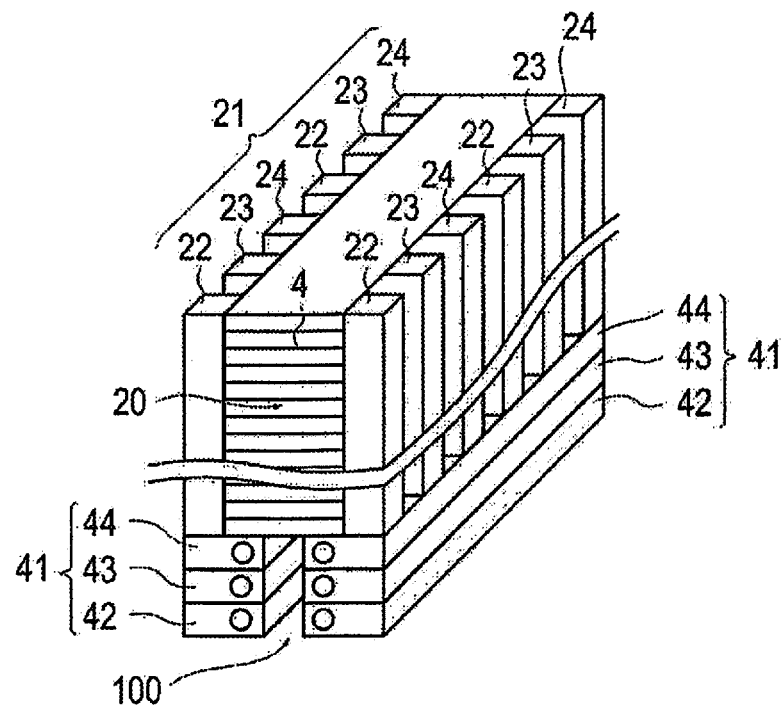
FIG. 13A is a view schematically illustrating an example of a layout of the cell laminate body and the external manifold.
Figure 13B:
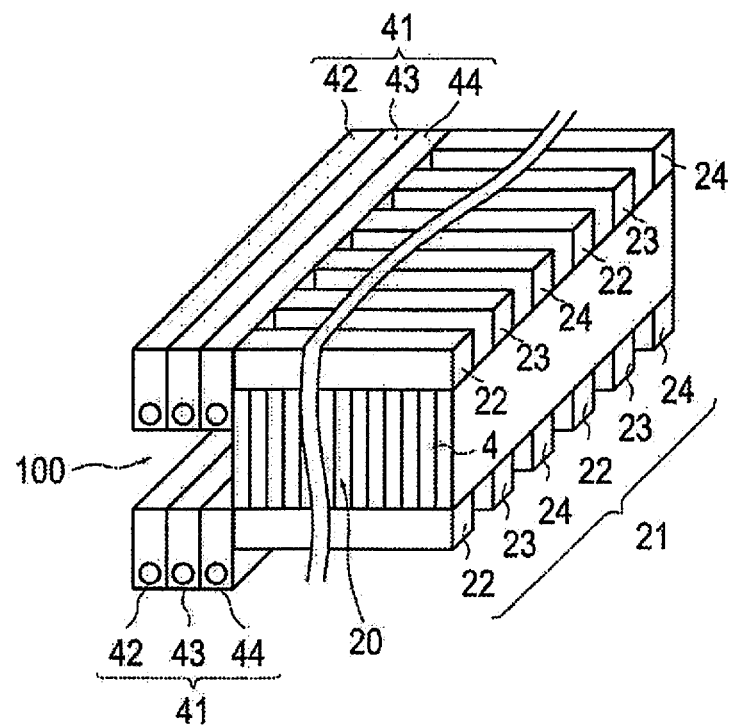
FIG. 13B is a view schematically illustrating an example of a layout of the cell laminate body and the external manifold.
Figure 13C:
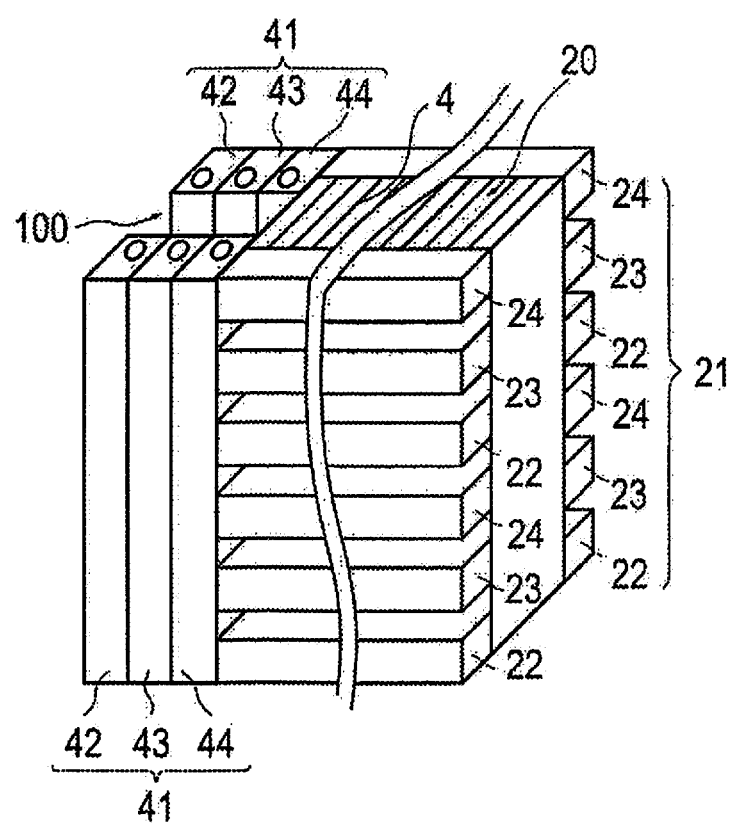
FIG. 13C is a view schematically illustrating an example of a layout of the cell laminate body and the external manifold.

FIG. 13A, FIG. 13B and FIG. 13C are views schematically illustrating examples of the layouts of the cell laminate body 20 and the external manifolds 41.

In the fuel cell illustrated in FIG. 13A, an internal manifold 24 is disposed in the vertical direction, and an external manifold 44 that connects to the internal manifold 24 is disposed below the cell laminate body 20, at least in the cathode. The cell laminate body 20 is configured so that the unit cells 4 are arranged along the horizontal direction. According to this kind of layout, generated water can be reliably discharged via gravity, and a fuel cell that maintains a flooding resistance ability can be provided.

In the fuel cell illustrated in FIG. 13B, an internal manifold 24 is disposed in the horizontal direction, and an external manifold 44 that connects to the internal manifold 24 is disposed below internal manifold 24, at least in the cathode. The cell laminate body 20 is configured so that the unit cells 4 are arranged along the vertical direction. Even according to this kind of layout, generated water can be reliably discharged via gravity, and a fuel cell that maintains a flooding resistance ability can be provided.

In the fuel cell illustrated in FIG. 13C, an external manifold 44 is disposed in the vertical direction, and an internal manifold 24 that connects to the external manifold 44 is disposed in the horizontal direction, at least in the cathode. The cell laminate body 20 is configured so that the unit cells 4 are arranged along the vertical direction.

In a fuel cell stack, smoothly removing the generated water accompanying the fuel cell reaction from the fuel cell stack via a flow channel is a problem that should always be considered when maintaining stable power generation. In FIGS. 13A to 13C, the flow channel direction is the horizontal direction in FIG. 13A or FIG. 13C, so that generated water can be smoothly discharged out of the fuel cell stack via the flow channels, regardless of whether the oxidation gas and the hydrogen gas are flowing parallel or opposite to each other. On the other hand, the flow channel direction is the vertical direction in FIG. 13B, so that, when the oxidation gas and the hydrogen gas are flowing in opposite directions of each other, the flow of one gas will always flow vertically from the bottom to the top; as a result, there are cases in which the generated water cannot be smoothly discharged out of the fuel cell stack via the flow channels when the flow rate of the gas is slow. In this embodiment, the generated water can be smoothly discharged by setting both the oxidation gas and the hydrogen gas to flow vertically from the top to the bottom as parallel flows. In general, the oxidation gas and the hydrogen gas are preferably flowing opposite directions of each other in a fuel cell reaction; thus, FIG. 13A or FIG. 13C is more preferable than FIG. 13B.

Next, when comparing FIG. 13A and FIG. 13C, the internal manifold 24 is disposed in the vertical direction in FIG. 13A while the internal manifold 24 is disposed in the horizontal direction in FIG. 13C. Since, in general, an internal manifold 24 disposed in the vertical direction, which can utilize gravity, has a better draining ability, FIG. 13A is more preferable than FIG. 13C. However, since the draining ability can be improved by various means besides gravity, such as by the flow rate of the gas and surface treatments, the layout of FIGS. 13A-13C is preferably selected not only with respect to the draining ability but also through a comprehensive determination. For example, when the laminate layer direction of the fuel cell stack is longer than the width direction (longitudinal direction) of the unit cells 4, the height of the fuel cell stack when being mounting to a vehicle can be kept low by employing the layout FIG. 13C. This is preferable in many cases in terms of vehicle design. Also, if the layout of FIG. 13A is employed and the width direction of the unit cells 4 is laid out in the same direction as the width direction of the vehicle, the longitudinal direction of the fuel cell stack in the vehicle can be shortened; as a result, a large crush zone volume in the event of collision can be secured.

Effects of the Present Embodiment

As described above, the fuel cell 1 of the first embodiment comprises a low-aspect structure, and the pressure loss when transporting necessary fluids to the fuel cell becomes physically lower than in a fuel cell comprising a high-aspect structure having the same cell pitch. Accordingly, when transporting at a constant pressure loss, miniaturization of the fuel cell can be achieved by using a smaller cell pitch. The fuel cell 1 according to the present invention comprises two or more fluid-supplying internal manifolds 21 and fluid-discharging internal manifolds 21 for each fluid. Accordingly, the various necessary fluids for the fuel cell 1 can be evenly supplied or discharged in the width direction of the unit cells 4, and the effect thereof is proportional to the number of the internal manifolds 21.

Additionally, a fluid-supplying external manifold 42a (43a, 44a), which is connected to the fluid-supplying internal manifold 22a (23a, 24a) via the supply-side communicating portion 50a, and a fluid-discharging external manifold 42b (43b, 44b), which is connected to the fluid-discharging internal manifold 22b (23b, 24b) via the discharge-side communicating portion 50b, are positioned outside of the cell laminate body 20 approximately parallel to each other, extending in the width direction of the cell laminate body 20. The entire fuel cell 1 can thereby be configured to be compact. As a result, providing a compact, high-output fuel cell 1 becomes possible.

The fluid-supplying and fluid-discharging external manifolds 41 (42, 43, 44) comprise openings at the ends in the same direction. The openings configuring the inlets and the openings configuring the outlets in the external manifolds 41 are open on the same surface. When compared to when opening the inlets and the outlets on opposite sides, the generation of unevenness in the flow amount in the width direction of the cell laminate body 20 in the internal manifolds 21 (22, 23, 24) and the flow channels can be suppressed.

A fluid distribution mechanism is provided for passing each of the fluids between the external manifolds 41 and the internal manifolds 21 while substantially crossing more than once. Accordingly, the various necessary fluids for the fuel cell 1 can be evenly supplied or discharged in the width direction and the laminate layer direction of the unit cells 4 while suppressing drift in the laminate layer direction in the internal manifolds. As a result, efficiently generating power becomes possible, and providing a compact, high-output fuel cell also becomes possible from this point of view.

The center line of the external manifolds 41 is offset to be inward of the center line of the internal manifolds 21. Accordingly, when compared to when disposing the external manifolds 41 outside of the cell laminate body 20, when viewed from the laminating direction of the unit cells 4, the volume occupied by the fuel cell can be reduced, and the degree of freedom in the layout can be increased.

Drift in the laminate layer direction in the internal manifolds 22, 23, 24 tends to occur in portions close to the fluid distribution device 100 immediately after connecting from the external manifold to the internal manifold via the communicating portion 50; this drift becomes more significant as the cross-sectional areas of the first and second auxiliary manifolds 51, 52 and the internal manifolds 21 decrease and as the flow amount increases. Whether the external manifold 44 of the cathode or the external manifold 42 of the anode moves to the position near the cell laminate body 20 cannot be categorically determined; however, a person skilled in the art would be able to appropriately determine this from the above point of view, based on the cross-sectional areas of the first and second auxiliary manifolds 51, 52 and the internal manifolds 21, as well as the flow amount.

For example, the external manifold 44 of the cathode and the external manifold 42 of the anode may be disposed overlapping, and the external manifold 44 of the cathode may be positioned closer to the cell laminate body 20 than the external manifold 42 of the anode. In the embodiment of this arrangement, regarding the distance between the external manifolds 42, 44 and the internal manifolds 22, 24, the flowing distance of the fuel gas can be set to be longer than the flowing distance of the oxidation gas. As a result, the inlet length of the fuel gas can be set to be long, and the fluids can be more evenly supplied or discharged in the width direction and the laminate layer direction of the unit cells 4 while suppressing drift in the laminate layer direction in the internal manifolds 22, 24.

An arrangement that is the reverse of the illustrated embodiment is also possible; in other words, the external manifold of the cathode and the external manifold of the anode may be disposed to be overlapping, and the external manifold of the cathode may be positioned farther from the cell laminate body 20 than the external manifold of the anode.

An internal manifold 24 is disposed in the vertical direction, and an external manifold 44 that connects to the internal manifold 24 is disposed below the cell laminate body 20, at least in the cathode. Alternatively, an internal manifold 24 is disposed in the horizontal direction, and an external manifold 44 that connects to the internal manifold 24 is disposed below the internal manifold 24, at least in the cathode. According to this kind of layout, generated water can be reliably discharged via gravity, and a fuel cell that maintains a flooding resistance ability can be provided.

In each fluid, the external manifolds 41 and the first and second auxiliary manifolds 51, 52 in the communicating portions 50 are disposed inside of the end plate 32. Miniaturization of the fuel cell 1 can be achieved by integrating the external manifolds 41 and the communicating portions 50 into the end plate 32.

In a cathode that uses cooling water and air, the discharge-side cross-sectional area of the external manifolds 43, 44 is set to be larger than the cross-sectional area of the supply-side. In a fluid in which the flow amount does not change while flowing or in which the amount of decrease is small, pressure loss on the discharge side can be reduced, and a good distribution ability can be achieved by configuring the discharge-side cross-sectional area to be larger than the supply-side cross-sectional area.

Three or more fluid-supplying internal manifolds 21 and fluid-discharging internal manifolds 21 may be provided for each fluid. The distribution ability can be improved by increasing the number according to the aspect ratio R.

According to the fluid distribution device 100 of the fuel cell 1 according to the first embodiment, the fluid-supplying external manifolds 42a, 43a, 44a and the fluid-discharging external manifolds 42b, 43b, 44b are formed in a block body 60 that configures the end plate 32; as a result, miniaturization of the fuel cell 1 can be achieved. Furthermore, since the configuration of the communicating portions 50a, 50b, which are adjacent to the external manifolds 42a, 43a, 44a, 42b, 43b, 44b, is simple and can be easily formed by means such as a cutting operation, the manufacturing of the fluid distribution device 100 can be simplified and can be performed inexpensively, as compared to when assembling by welding and joining numerous parts.

Since the vehicle 18 of the present embodiment comprises a miniaturized fuel cell, the vehicle will have excellent mountability, productivity, and cost.

Second Embodiment

Figure 14A:
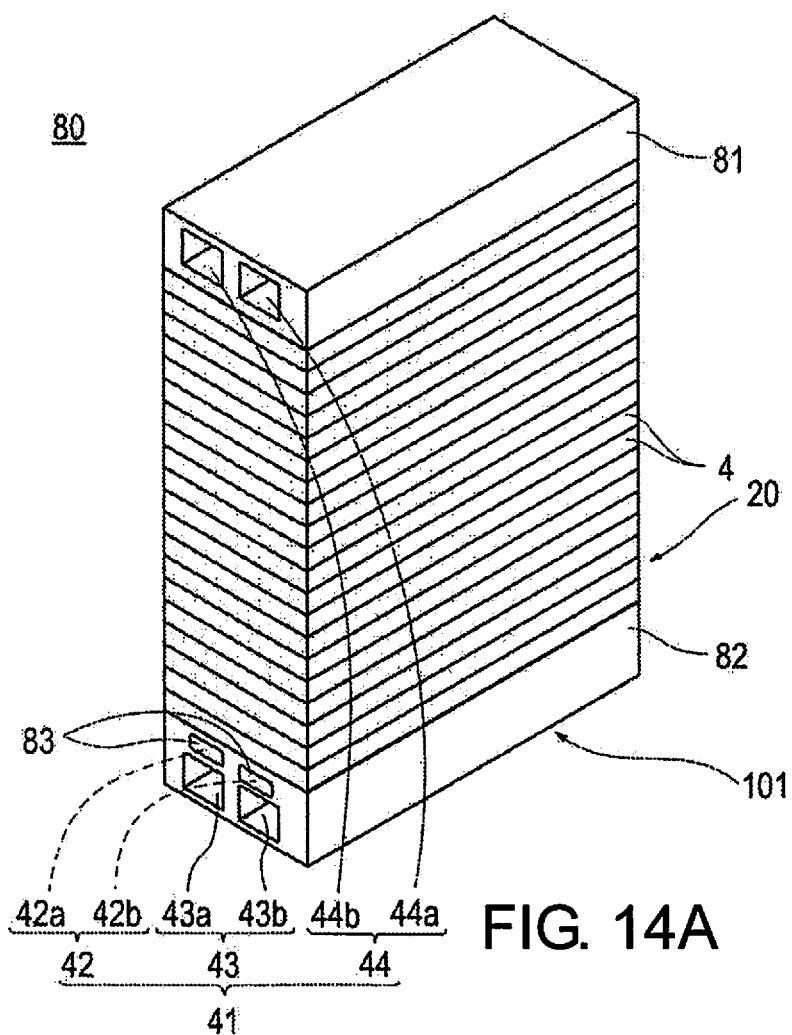
FIGS. 14A and 14B are a perspective view and a plan view illustrating the fuel cell according to a second embodiment.
Figure 14B:
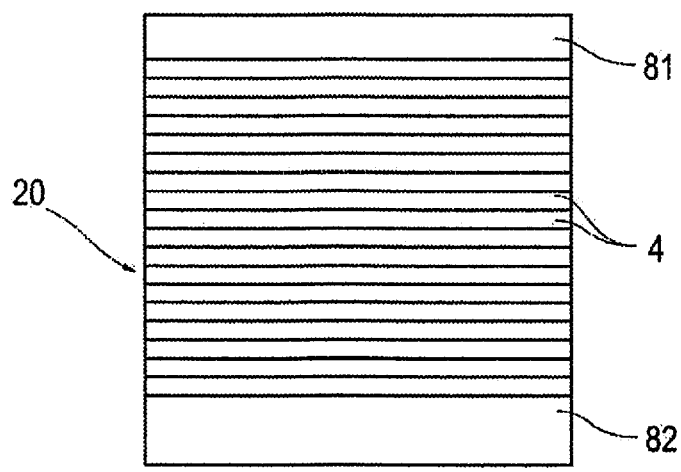
Figure 15A:
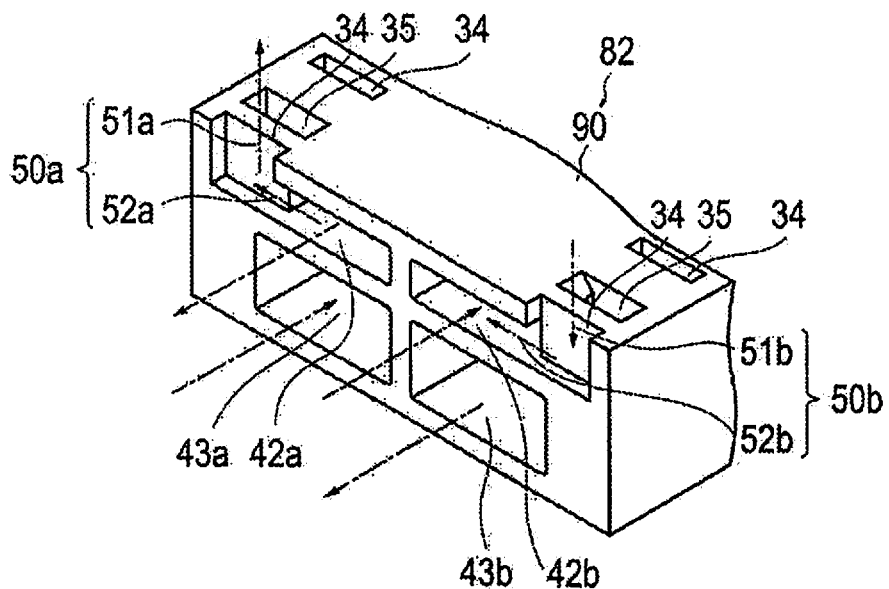
FIG. 15A is a perspective view illustrating a cross section of the principle part of the lower side end plate that incorporates a fluid distribution device according to the second embodiment.
Figure 15B:
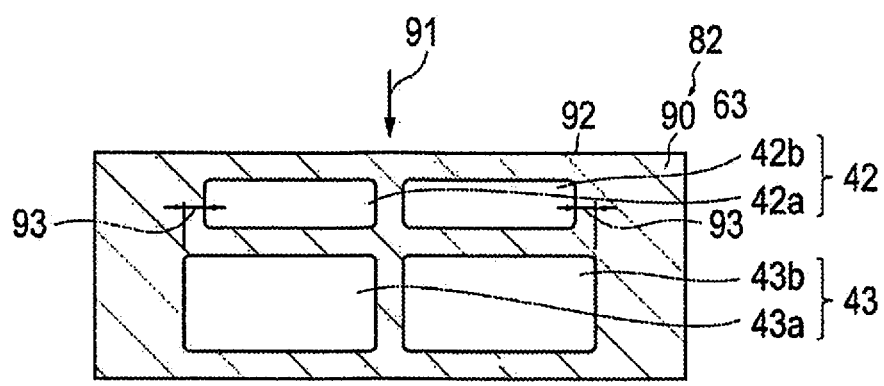
FIG. 15B is a cross-sectional view illustrating the lower side end plate to which is provided an external manifold.
Figure 16A:
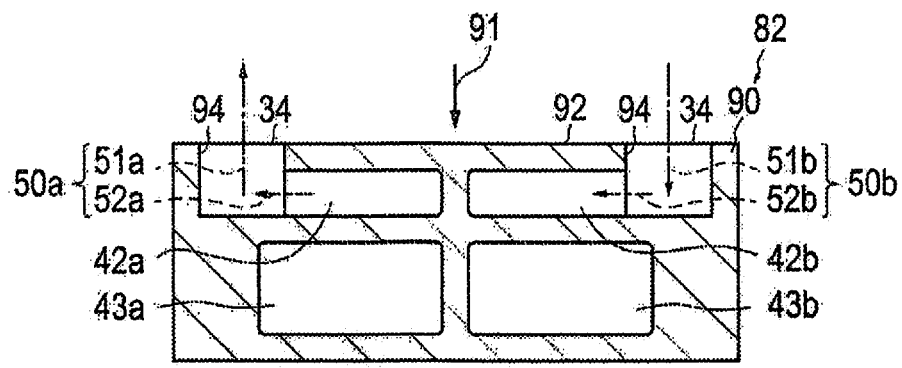
FIGS. 16A and 16B are cross-sectional views illustrating the states in which the first and the second auxiliary manifolds in the supply-side communicating portion, as well as the first and the second auxiliary manifolds in the discharge-side communicating portion, are formed for each fluid in the block body configuring the lower side end plate.
Figure 16B:
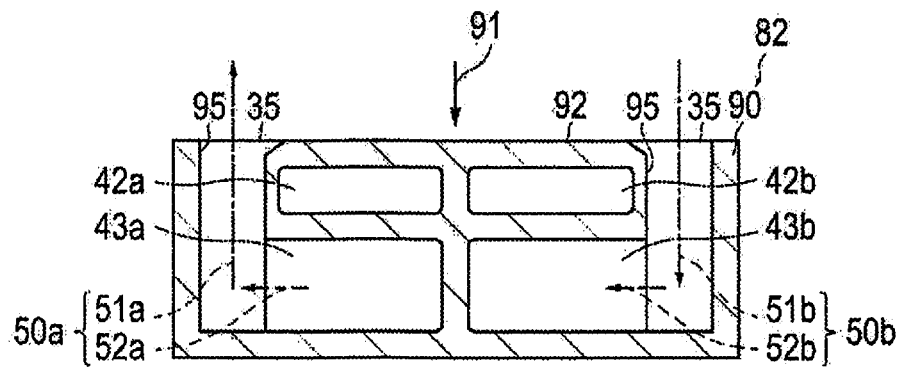

FIGS. 14A and 14B are a perspective view and a plan view illustrating the fuel cell 80 according to a second embodiment; FIG. 15A is a perspective view illustrating a cross-section of the principle part of the lower side end plate 82 that incorporates a fluid distribution device 101 according to the second embodiment, and FIG. 15B is a cross-sectional view illustrating the lower side end plate 82 to which an external manifold 41 is provided. FIGS. 16A and 16B are cross-sectional views illustrating states in which the first and the second auxiliary manifolds 51a, 52a in the supply-side communicating portion 50a, as well as the first and the second auxiliary manifolds 51b, 52b in the discharge-side communicating portion 50b, are formed for each fluid in a block body 90 configuring the lower side end plate 82. Members common to the members illustrated in FIGS. 1-13C have been given the same reference codes, and the explanations thereof have been omitted.

In the second embodiment, external manifolds 42, 43 of two fluids among the fuel gas, the cooling water, and the oxidation gas, along with a communicating portion 50, are provided in the same lower side end plate 82. The second embodiment is different in this point from the first embodiment, in which the external manifolds 42, 43, 44 of all three fluids, as well as a communicating portion 50, are disposed in the same end plate 32.

In the second embodiment, the external manifolds 42, 43 of the fuel gas and the cooling water, as well as a communicating portion 50, are disposed in the lower side end plate 82, as illustrated on the lower side of the drawing; the external manifold 44 of the oxidation gas, as well as a communicating portion 50, are disposed in an upper side end plate 81, as illustrated on the upper side of the drawing. Of the opposing sides of the lower side end plate 82, the inlet and the outlet of the external manifold 43 for the cooling water are open on the first side (the front left side in the drawing), and the inlet and the outlet of the external manifold 42 for the fuel gas are open on the second side, which is on the opposite side, as illustrated in FIGS. 14A and 14B. The inlet and the outlet of the external manifold 44 for the oxidation gas are open on the first side of the upper side end plate 81. The external manifolds 41 are formed from through-holes that penetrate from the first side to the second side of the end plates 81, 82. The openings on the second side of the external manifold 43 for the cooling water and the external manifold 44 for the oxidation gas are sealed by a closing plate after forming the through-holes. On the other hand, the opening on the first side of the external manifold 42 for the fuel gas is sealed by a closing plate 83 after forming the through-hole.

Regarding the lower side end plate 82, the supply-side communicating portions 50a comprise at least a first auxiliary manifold 51a, which is connected to the fluid-supplying internal manifolds 22a, 23a, and a second auxiliary manifold 52a, which comprises a center line that intersects with the center lines of the fluid-supplying external manifolds 42a, 43a, as well as the center line of the first auxiliary manifold 51a, and which is connected to the fluid-supplying external manifolds 42a, 43a, as illustrated in FIGS. 15A and 15B and FIGS. 16A and 16B. Similarly, the discharge-side communicating portions 50b comprise at least a first auxiliary manifold 51b, which is connected to the fluid-supplying internal manifolds 22b, 23b, and a second auxiliary manifold 52b, which comprises a center line that intersects with the center lines of the fluid-discharging external manifolds 42b, 43b, as well as the center line of the first auxiliary manifold 51b, and which is connected to the fluid-discharging external manifolds 42b, 43b.

Regarding the upper side end plate 81, while a diagram has been omitted, the center line of the second auxiliary manifolds 52 of the communicating portions 50 intersects with the center line of the external manifolds 44 and intersects with the center line of the first auxiliary manifolds 51 that are connected to the internal manifolds 24.

In the second embodiment as well, in a fuel cell comprising a low-aspect structure and comprising two or more fluid-supplying internal manifolds 21 and fluid-discharging internal manifolds 21 for each fluid, various necessary fluids for the fuel cell 80 can be evenly supplied or discharged in the width direction of the unit cells 4, as well as in the laminate layer direction, by providing a distribution mechanism for passing each fluid between the external manifolds 41 and the internal manifolds 21 while substantially crossing more than once. As a result, efficiently generating power becomes possible, and providing a compact, high-output fuel cell becomes possible.

The fluid distribution device 101 of the second embodiment comprises a block body 90, in which external manifolds 42, 43 are formed, and the first and second auxiliary manifolds 51 (51a, 51b), 52 (52a, 52b) of the communicating portions 50 (50a, 50b) in the fuel gas and the cooling water, as illustrated in FIG. 15. The block body 90 configures the lower side end plate 82.

If the surface on the side of the block body 90 to which the cell laminate body 20 is disposed were to be one surface 92, the external manifold 42 for the first fluid that flows on the side closer to the one surface 92 and the external manifold 43 for the second fluid that flows on the side farther from the one surface 92 are disposed partially overlapping, when viewed from the one surface 92 side of the block body 90, as illustrated by the arrow 91. Additionally, the external manifold 43 for the second fluid includes an extension portion 93 that does not overlap with the external manifold 42 for the first fluid, when viewed from the one surface 92 side of the block body 90. The one surface 92 of the block body 90 is connected to the lower surface of the cell laminate body 20. In the embodiment of the second embodiment, the first fluid is fuel gas, and the second fluid is cooling water. That is, since the oxidation gas external manifold 44 is disposed to the upper side end plate 81, there are cases in which water that is produced by the reaction of the fuel cell accumulates in the lower part of the oxidation gas internal manifold 24. In this embodiment, a drain hole may be formed from the lower part of the internal manifold 24 toward the outside of the block body 90.

On the other hand, the first fluid of the block body 90 may be fuel gas, and the second fluid may be oxidation gas, as a modified example of the second embodiment. In this embodiment, the external manifold 44 of the cooling water is disposed to the upper side end plate 81. However, since all of the manifolds and flow channels are constantly filled with cooling water, forming the drain hole is not necessary. However, since the fuel gas external manifold cannot be directly temperature controlled with the cooling water external manifold, there are cases that separately require a device for controlling the temperature of the fuel gas.

The first and the second auxiliary manifolds 51, 52 in the communicating portion 50 of each fluid are formed in the following manner.

Regarding the supply-side communicating portion 50a for the first fluid (fuel gas), a first hole portion 94 that communicates only to the external manifold 42a for the first fluid is formed from the one surface 92 side, as illustrated in FIG. 16A. A portion of the side wall that forms a partition in the external manifold 42a for the first fluid is removed by the first hole portion 94, and first and second auxiliary manifolds 51a, 52a for the first fluid are formed.

Regarding the discharge-side communicating portion 50b for the first fluid, a first hole portion 94 that communicates only to the external manifold 42b for the first fluid is formed from the one surface 92 side, as illustrated in FIG. 16A. A portion of the side wall that forms a partition in the external manifold 42b for the first fluid is removed by the first hole portion 94, and first and second auxiliary manifolds 51b, 52b for the first fluid are formed.

Regarding the supply-side communicating portion 50a for the second fluid (cooling water), a second hole portion 95 that communicates only to the external manifold 43a for the second fluid in the extension portion 93 (refer to FIG. 15B) is formed from the one surface 92 side, as illustrated in FIG. 16B. A portion of the side wall that forms a partition in the external manifold 43a for the second fluid is removed by the second hole portion 95, and first and second auxiliary manifolds 51a, 52a for the second fluid are formed.

Regarding the discharge-side communicating portion 50b for the second fluid, a second hole portion 95 that communicates only to the external manifold 43b for the second fluid in the extension portion 93 is formed from the one surface 92 side, as illustrated in FIG. 16B. A portion of the side wall that forms a partition in the external manifold 43b for the second fluid is removed by the second hole portion 95, and first and second auxiliary manifolds 51b, 52b for the second fluid are formed.

An inclined surface that is inclined from the one surface 92 toward the hole portion 95 is formed in the upper portion of the second hole portion 95. The size of the connection port 35 for cooling water in the left-right direction in FIG. 16 is thereby set to be the same size as the connection port 34 for fuel gas.

According to the fluid distribution device 101 of the fuel cell 80 according to the second embodiment, the external manifold 44 and the communicating portion 50 are formed in a block body that configures the upper side end plate 81, and the external manifolds 42, 43 and the communicating portion 50 are formed in a block body 90 that configures the lower side end plate 82; as a result, miniaturization of the fuel cell 80 can be achieved. In addition, since the external manifolds 41 and the first and second auxiliary manifolds 51, 52 in the communicating portions 50 can be formed by cutting operations, the manufacturing of the fluid distribution device 101 can be simplified and can be performed inexpensively, as compared to when assembling by welding and joining numerous parts.

When forming first and second auxiliary manifolds for the third fluid in the block body 90, an appropriate arrangement is possible in accordance with the configuration of the auxiliary manifolds for the first and second fluids.

Other Modified Examples

In the first embodiment, two or more flow channel openings 9 are disposed in each of the two ends of the anode flow channel, wherein one end is formed as a supply flow channel and the other end is formed as a discharge flow channel, and two or more flow channel openings 11 are disposed in each of the two ends of the cathode flow channel, wherein one end is formed as a supply flow channel and the other end is formed as a discharge flow channel. The flow channel openings 9 in the anode flow channel are laminated to configure the two or more fluid-supplying internal manifolds 22a and the two or more fluid-discharging internal manifolds 22b. The flow channel openings 11 in the cathode flow channel are laminated to configure the two or more fluid-supplying internal manifolds 24a and the two or more fluid-discharging internal manifolds 24b.

The configuration to evenly supply or discharge various fluids in the width direction of the unit cells 4 is not limited to a configuration in which two or more flow channel openings 9, 10, 11 are disposed in each of the two ends of the respective flow channels.

That is, the cell laminate body 20 may be configured so that the aspect ratio R (L/W) is less than 1; so that two or more of at least one of the flow channel openings 9 at the two ends of the anode flow channel are provided, wherein one end is formed as a supply flow channel and the other end is formed as a discharge flow channel; and so that two or more of at least one of the flow channel openings 11 at the two ends of the cathode flow channel are provided, wherein one end is formed as a supply flow channel and the other end is formed as a discharge flow channel. The flow channel openings 9 in the anode flow channel are laminated to configure the fluid-supplying internal manifolds 22a and the fluid-discharging internal manifolds 22b, and the flow channel openings 11 in the cathode flow channel are laminated to configure the fluid-supplying internal manifolds 24a and the fluid-discharging internal manifolds 24b. The external manifolds 42a, 42b, 44a, 44b that are connected to the internal manifolds 22a, 22b, 24a, 24b extend in a direction that intersects with the internal manifolds 22a, 22b, 24a, 24b.

Various fluids can also be evenly supplied or discharged in the width direction of the unit cells 4 in a fuel cell configured in this way.

In this embodiment, each of the fluid-supplying external manifolds 42a, 44a that are connected to the fluid-supplying internal manifolds 22a, 24a, as well as the fluid-discharging external manifolds 42b, 44b that are connected to the fluid-discharging internal manifolds 22b, 24b, is positioned extending in the width direction of the cell laminate body 20. The entire fuel cell can thereby be configured to be compact. As a result, providing a compact, high-output fuel cell becomes possible.

In the first and second embodiments, external manifolds 41, as well as the first and second auxiliary manifolds 51, 52, were formed in the block bodies 60, 90 that configure the end plates 32, 82; however, the present invention is not limited to this embodiment. For example, a collector plate may be configured from a block body, and external manifolds 41, as well as the first and second auxiliary manifolds 51, 52, may be formed in this block body. Also, a dedicated block body on which fluid distribution devices 100, 101 are disposed may be used in addition to the end plates and the collector plates.

Furthermore, in the first and second embodiments, the external manifolds 41, as well as the first and second auxiliary manifolds 51, 52, were formed by cutting the block body; however, the present invention is not limited to this embodiment. For example, a similar structure may be formed using well-known techniques, such as casting or 3D printing. In addition, while the manufacturing of the fluid distribution devices 100, 101 will become slightly more complicated, as compared to when using a cutting operation, the external manifolds, as well as the first and second auxiliary manifolds, may be formed by connecting pipe members.

What is claimed is:

1. A fluid distribution device that distributes at least two fluids among an anode, a cathode and a cooling fluid of a fuel cell, the fuel cell including a cell laminate body comprising at least one membrane electrode assembly, the fluid distribution device comprising:

a block body including a side surface on which the cell laminate body is disposed;

a first external manifold disposed in the block body to convey a first fluid, the first external manifold including a first fluid-supplying external manifold and a first fluid-discharging external manifold, the first external manifold being disposed adjacent to the side surface of the block body;

a second external manifold disposed in the block body to convey a second fluid, the second external manifold including a second fluid-supplying external manifold and a second fluid-discharging external manifold, the second external manifold being disposed adjacent to a side of the block body that is farther from the side surface, the second external manifold being disposed so as to partially overlap with the first external manifold as viewed from perpendicularly to the side surface of the block body, the second external manifold includes an extension portion for the second fluid that extends beyond a width of the first external manifold when viewed perpendicularly to the side surface of the block body;

a first communicating portion having a first hole only communicating the first fluid to the first external manifold from the side surface; and a second communicating portion having a second hole only communicating the second fluid to the extension portion of the second external manifold from the side surface, the first and second external manifolds disposed external to the cell laminate body and the at least one membrane electrode assembly.

2. The fluid distribution device according to claim 1, wherein the first fluid-supplying external manifold and the first fluid-discharging external manifold are positioned approximately parallel to each other.

3. The fluid distribution device according to claim 1, wherein the second fluid-supplying external manifold and the second fluid-discharging external manifold are positioned approximately parallel to each other.

4. The fluid distribution device according to claim 3, wherein the first fluid-supplying external manifold and the first fluid-discharging external manifold are positioned approximately parallel to each other.

5. The fluid distribution device according to claim 1, wherein the second external manifold includes an additional extension portion for the second fluid that does not overlap with the first external manifold as viewed perpendicularly to the side surface of the block body.

6. The fluid distribution device according to claim 1, further comprising a third external manifold disposed in the block body to convey a third fluid, the third external manifold including a third fluid-supplying external manifold and a third fluid-discharging external manifold.

7. The fluid distribution device according to claim 6, wherein the third external manifold is disposed in the block body between the first and second external manifolds.

8. The fluid distribution device according to claim 7, wherein the third external manifold is disposed so as to partially overlap with the first and second external manifolds as viewed from perpendicularly to the side surface of the block body, the third external manifold includes an extension portion for the third fluid that does not overlap with the first external manifold as viewed perpendicularly to the side surface of the block body.

9. The fluid distribution device according to claim 8, wherein the third external manifold includes an additional extension portion for the third fluid that does not overlap with the first external manifold as viewed perpendicularly to the side surface of the block body.

10. The fluid distribution device according to claim 1, wherein the side surface of the block body is substantially rectangular.

11. The fluid distribution device according to claim 1, wherein the first external manifold and the second external manifold are disposed in an end plate disposed on an end of the cell laminate body of the fuel cell.

12. A fuel cell stack including the fluid distribution device according to claim 1, further comprising a cell laminate body disposed on the side surface of the block body.

13. A vehicle comprising the fluid distribution device according to claim 1 and the fuel cell having a cell laminate body disposed on the side surface of the block body.

* * * * *